(12) United States Patent
Herath et al.

(10) Patent No.: US 11,206,113 B2
(45) Date of Patent: Dec. 21, 2021

(54) SYSTEMS AND METHODS FOR NOMA (NON-ORTHOGONAL MULTIPLE ACCESS) TRANSMITTER WITH LEGACY MODULATORS

(71) Applicant: Huawei Technologies Co., Ltd., Shenzhen (CN)

(72) Inventors: Sanjeewa Herath, Ottawa (CA); Alireza Bayesteh, Ottawa (CA); Yiqun Ge, Kanata (CA); Jianglei Ma, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 102 days.

(21) Appl. No.: 16/565,744

(22) Filed: Sep. 10, 2019

(65) Prior Publication Data

US 2020/0092057 A1 Mar. 19, 2020

Related U.S. Application Data

(60) Provisional application No. 62/731,682, filed on Sep. 14, 2018.

(51) Int. Cl.
*H04L 5/00* (2006.01)
*H04W 72/04* (2009.01)
*H04L 1/00* (2006.01)

(52) U.S. Cl.
CPC .......... *H04L 5/0016* (2013.01); *H04L 1/0003* (2013.01); *H04L 1/0071* (2013.01); *H04L 5/0046* (2013.01); *H04W 72/0466* (2013.01)

(58) Field of Classification Search
CPC ... H04L 5/0016; H04L 5/0046; H04L 1/0003; H04L 1/0071; H04W 72/0466
See application file for complete search history.

(56) References Cited

U.S. PATENT DOCUMENTS

| | | | |
|---|---|---|---|
| 2018/0054218 A1 | 2/2018 | Qian et al. | |
| 2018/0077685 A1* | 3/2018 | Wu | H04W 72/0413 |
| 2018/0083666 A1 | 3/2018 | Bayesteh et al. | |

(Continued)

FOREIGN PATENT DOCUMENTS

CN 107786482 A 3/2018

OTHER PUBLICATIONS

U.S. Appl. No. 62/652,495, filed Apr. 4, 2018. (Year: 2018).*

(Continued)

*Primary Examiner* — Melvin C Marcelo
(74) *Attorney, Agent, or Firm* — Slater Matsil, LLP

(57) ABSTRACT

A system and method of non-orthogonal multiple access (NoMA) transmission using a configurable NoMA scheme is provided. A bit level processor, a modulation block, a phase and amplitude adjuster, and a symbol to resource element mapper collectively produce a NoMA signal for output or transmission. A NoMA scheme implemented by the system and method is configurable through one or more NoMA configuration inputs that configure one or more of the bit level processor, the modulation block, the phase and amplitude adjustment block and the symbol to resource element mapper. A multiple access (MA) signature produced by the apparatus once configured for the particular NoMA scheme is selectable through one or more MA signature inputs.

25 Claims, 17 Drawing Sheets

(56) References Cited

U.S. PATENT DOCUMENTS

| | | | |
|---|---|---|---|
| 2018/0337816 A1 | 11/2018 | Herath et al. | |
| 2019/0190753 A1* | 6/2019 | Bayesteh | ............ H04J 13/0077 |
| 2020/0413413 A1* | 12/2020 | Haghighat | .............. H04L 5/006 |

OTHER PUBLICATIONS

Intel Corp., "NOMA related procedure," R1-1802427, 3GPP TSG RAN WG1 Meeting #92, Feb. 26-Mar. 2, 2018, pp. 1-8. (Year: 2018).*

Convida Wireless Design Consideration for NOMA Transmitter 3GPP TSG-RAN WGI Meeting #93 R1-1807223 May 25, 2018, total 4 pages.

ZTE Offline summary of transmitter side signal processing schemes for NOMA 3GPP TSG RAN WGI Meeting #94 R1-1809786 Aug. 24, 2018, total 19 pages.

CMCC, "Considerations on Rel-15 NoMA Transmitter Design", 3GPP TSG RAN WG1 Meeting #9 3, R1-1806372, May 21-25, 2018, 5 Pages, Busan, Korea.

* cited by examiner

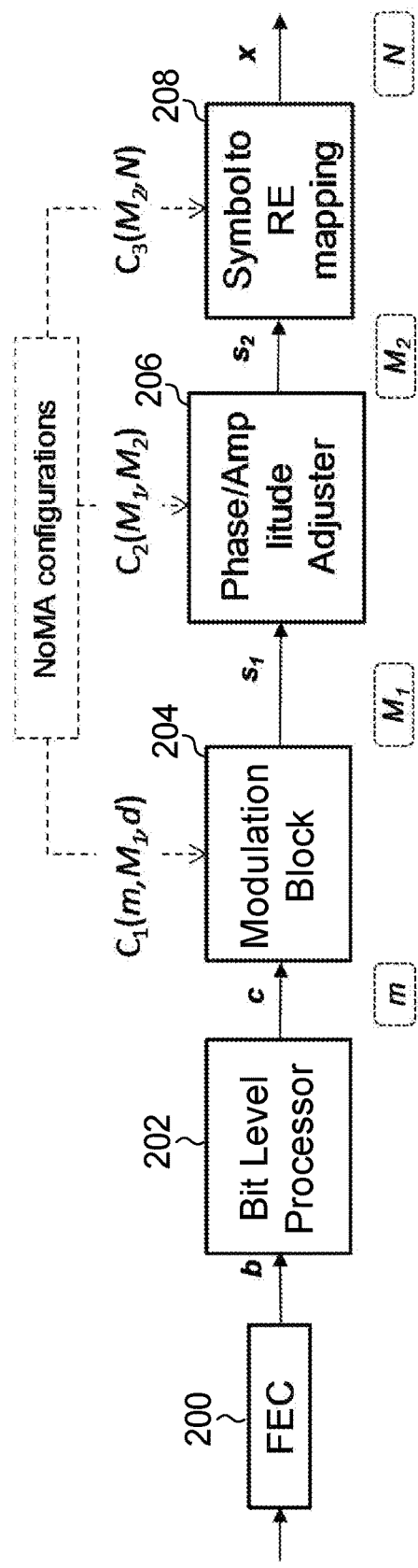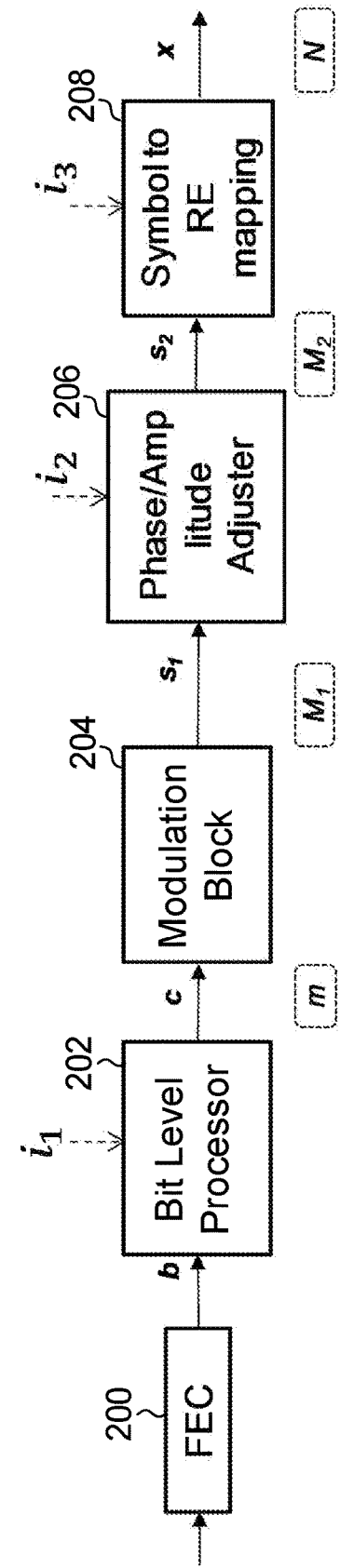
FIG. 2A
FIG. 2B

SYSTEMS AND METHODS FOR NOMA (NON-ORTHOGONAL MULTIPLE ACCESS) TRANSMITTER WITH LEGACY MODULATORS

This application claims the benefit of U.S. Provisional Application No. 62/731,682 filed Sep. 14, 2018, which is hereby incorporated by reference.

FIELD

The present disclosure relates generally to wireless communication and, in particular embodiments, to methods and systems for non-orthogonal multiple access communication.

BACKGROUND

A number of transmitters may be associated to one receiver in a multiple access communication system. Some transmitters may simultaneously transmit different signals on the same radio resources, thereby resulting into a collision at the receiver. Simultaneously transmitting different signals on the same radio resources would enhance overall system capacity if the receiver manages to achieve a similar receiving performance with this collision as without the collision. The system capacity enhancement is especially relevant on uplink or reverse link (i.e., radio transmissions from a number of terminals to a base-station).

An outcome of the collision is largely related to the methods or topologies by which the multiple simultaneous transmitters transmit on the same resource. In wireless radio communication systems, the definition, specification, or mechanism of these methods or topologies is known as non-orthogonal multiple access (NoMA) technology.

To help a receiver to resolve the collision, a NoMA technology seeks to minimize the resultant interferences at the receiver. Although NoMA technology typically improves the spectrum efficiency of a communication system, the non-orthogonality inherent in the NoMA technology may also create challenges in terms of transmitter and receiver implementation. It is desirable to design a non-orthogonal multiple access transmission mechanism that simplifies or facilitates transmitter and receiver implementation.

SUMMARY

Technical advantages are generally achieved, by embodiments of this disclosure which describe methods and systems for non-orthogonal multiple access communication.

According to one aspect of the disclosure, there is provided an apparatus comprising: a bit level processor that performs interleaving or scrambling or interleaving and scrambling on an input bit sequence to produce an output bit sequence of the same length; a modulation block comprising at least one modulator, the modulation block producing a modulated symbol stream containing at least one symbol based on the output bit sequence; a phase and amplitude adjuster for applying a respective phase and amplitude adjustment to each symbol of the modulated symbol stream to produce phase and amplitude adjusted symbols; a symbol to resource element mapper for mapping the phase and amplitude adjusted symbols to resource elements to obtain a non-orthogonal multiple access (NoMA) signal; and a transmitter operatively coupled to the symbol-to-RE mapper, the transmitter configured to transmit, or output, the NoMA signal, for example to a receiver; wherein a NoMA scheme implemented by the apparatus is configurable through one or more NoMA configuration inputs that configure one or more of the bit level processor, the modulation block, the phase and amplitude adjustment block and the symbol to resource element mapper; wherein a multiple access (MA) signature produced by the apparatus once configured for the particular NoMA scheme is selectable through one or more MA signature inputs.

Optionally, the NoMA configuration inputs configure all of the modulation block, the phase and amplitude adjustment block, and the symbol to resource element mapper.

Optionally, the MA signature inputs select a scrambling sequence and/or interleaving pattern applied by the bit level processor from a pool of possible scrambling sequences and/or interleaving patterns for the configured NoMA scheme.

Optionally, the MA signature inputs select at least one of: a scrambling sequence and/or an interleaving pattern applied by the bit level processor from a pool of possible scrambling sequences; or an interleaving pattern from a pool of possible interleaving patterns; or a scrambling sequences and an interleaving patterns; for the configured NoMA scheme.

Optionally, the MA signature inputs select a set of amplitude and phase adjustments applied by the phase and amplitude adjuster from a pool of possible sets of amplitude and phase adjustments for the configured NoMA scheme.

Optionally, the MA signature inputs select the symbol-to-resource mapping applied by the symbol to resource element mapper from a pool of possible symbol-to-resource mappings for the configured NoMA scheme.

Optionally, the NoMA configuration inputs configure the modulation block in terms of one or more of: modulation order defining how many bits are mapped to a symbol; modulation block size defining how many symbols are produced by the modulation block; bit mapping defining how bits input to the modulation block are mapped to symbols as between a non-overlapping manner in which each bit is mapped to only one symbol, partially overlapping manner in which some but not all bits are mapped to more than one symbol, and fully overlapping manner in which all its are mapped to multiple symbols.

Optionally, the modulation block comprises: a plurality of modulators; a bit sub-set generator that generates a respective subset of bits of the output bit sequence for input to each of at least one active modulator of the plurality of the plurality of modulators.

Optionally, the NoMA configuration inputs configure the number and type of the at least one active modulators, and configure the bit sub-set generator to generate the respective subset of bits as either a distinct subset, partially overlapping subset or fully overlapping subset.

Optionally, the NoMA configuration inputs configure the phase and amplitude adjuster in terms of: modulation block size defining how many symbols are processed by the phase and amplitude adjuster; output block size defining how many symbols are output by the phase and amplitude adjuster.

Optionally, NoMA configuration inputs configure the symbol-to-RE mapper in terms of: block size defining how many symbols are input to the symbol to resource element mapper; number of resources that are mapped to by the symbol-to-RE mapper.

Optionally, the apparatus comprises a receiver for receiving signaling that conveys at least one of the NoMA configuration inputs and/or at least one of the MA signature inputs.

Optionally, the apparatus is further configured to make at least one performance measurement for use in selecting a specific NoMA scheme. According to another aspect of the present disclosure, there is provided a method comprising: performing interleaving or scrambling or interleaving and scrambling on an input bit sequence to produce an output bit sequence of the same length; based on the output bit sequence, producing a modulated symbol stream containing at least one symbol; applying a respective phase and amplitude adjustment to each symbol of the modulated symbol stream to produce phase and amplitude adjusted symbols; mapping the phase and amplitude adjusted symbols to resource elements to obtain a non-orthogonal multiple access (NoMA) signal; and outputting the NoMA signal, for example by transmitting the NoMA signal to a receiver; configuring a NoMA scheme implemented by the through one or more NoMA configuration inputs that configure one or more of the interleaving or scrambling or interleaving and scrambling step, the modulation step, the phase and amplitude adjustment step and the symbol to resource element mapping step; wherein a multiple access (MA) signature produced by the method once configured for the particular NoMA scheme is selectable through one or more MA signature inputs.

Optionally, the NoMA configuration inputs configure all of the modulation block, the phase and amplitude adjustment block, and the symbol to resource element mapper.

Optionally, the MA signature inputs select a scrambling sequence and/or interleaving pattern applied from a pool of possible scrambling sequences and/or interleaving patterns for the configured NoMA scheme.

Optionally, the MA signature inputs selects at least one of: a scrambling sequence from a pool of possible scrambling sequences; or an interleaving pattern from a pool of possible interleaving patterns; or a scrambling sequence and an interleaving pattern for the configured NoMA scheme.

Optionally, the MA signature inputs select a set of amplitude and phase adjustments applied from a pool of possible sets of amplitude and phase adjustments for the configured NoMA scheme.

Optionally, the MA signature inputs select a the symbol-to-resource mapping from a pool of possible symbol-to-resource mappings for the configured NoMA scheme.

Optionally, wherein the NoMA configuration inputs configure the modulation step in terms of one or more of: modulation order defining how many bits are mapped to a symbol; modulation block size defining how many symbols are produced by the modulation block; bit mapping defining how bits input to the modulation step are mapped to symbols as between a non-overlapping manner in which each bit is mapped to only one symbol, partially overlapping manner in which some but not all bits are mapped to more than one symbol, and fully overlapping manner in which all its are mapped to multiple symbols.

Optionally, the method further comprises: as part of the modulation step, generating a respective subset of bits of the output bit sequence for input to each of at least one active modulator of the plurality of the plurality of modulators.

Optionally, the NoMA configuration the step of applying amplitude and phase adjustment in terms of: modulation block size defining how many symbols are processed by the phase and amplitude adjustment step; output block size defining how many symbols are output by the phase and amplitude adjustment step.

Optionally, the NoMA configuration inputs configure the symbol-to-RE mapping step in terms of: block size defining how many symbols are input to the symbol to resource element mapping step; number of resources that are mapped to by the symbol-to-RE mapping step.

Optionally, the method further comprises receiving signaling that conveys at least one of the NoMA configuration inputs and/or at least one of the MA signature inputs.

Optionally, the method is further configured to make at least one performance measurement for use in selecting a specific NoMA scheme.

According to another aspect of the present disclosure, there is provided an apparatus comprising: a processor; and a non-transitory computer readable storage medium storing programming for execution by the processor, the programming including instructions to: perform interleaving or scrambling or interleaving and scrambling on an input bit sequence to produce an output bit sequence of the same length; based on the output bit sequence, produce a modulated symbol stream containing at least one symbol; apply a respective phase and amplitude adjustment to each symbol of the modulated symbol stream to produce phase and amplitude adjusted symbols; map the phase and amplitude adjusted symbols to resource elements to obtain a non-orthogonal multiple access (NoMA) signal; and output the NoMA signal, for example by transmitting the NoMA signal to a receiver; wherein a NoMA scheme implemented by the method is configurable through one or more NoMA configuration inputs that configure one or more of the interleaving, or scrambling, or interleaving and scrambling, the modulation step, the phase and amplitude adjustment step and the symbol to resource element mapping step; wherein a multiple access (MA) signature produced by the method once configured for the particular NoMA scheme is selectable through one or more MA signature inputs.

Optionally, the MA signature inputs selects at least one of: a scrambling sequence from a pool of possible scrambling sequences; or an interleaving pattern from a pool of possible interleaving patterns; or a scrambling sequence and an interleaving pattern; for the configured NoMA scheme.

According to another aspect of the present disclosure, there is provided a method comprising: configuring a NoMA scheme to be implemented by a user equipment by transmitting one or more NoMA configuration inputs to the user equipment that configure a modulation step, a phase and amplitude adjustment step and a symbol to resource element mapping step for the NoMA scheme; receiving a NoMA signal based on the configured NoMA scheme.

BRIEF DESCRIPTION OF THE DRAWINGS

For a more complete understanding of the present disclosure, and the advantages thereof, reference is now made to the following description taken in conjunction with the accompanying drawings, in which:

FIG. 2A is a diagram of an embodiment transmitter for transmitting a signal in the wireless communications network showing NoMA configuration inputs;

FIG. 2B is a diagram of the embodiment transmitter of FIG. 2A showing MA signature configuration inputs;

DETAILED DESCRIPTION

Figure 1:
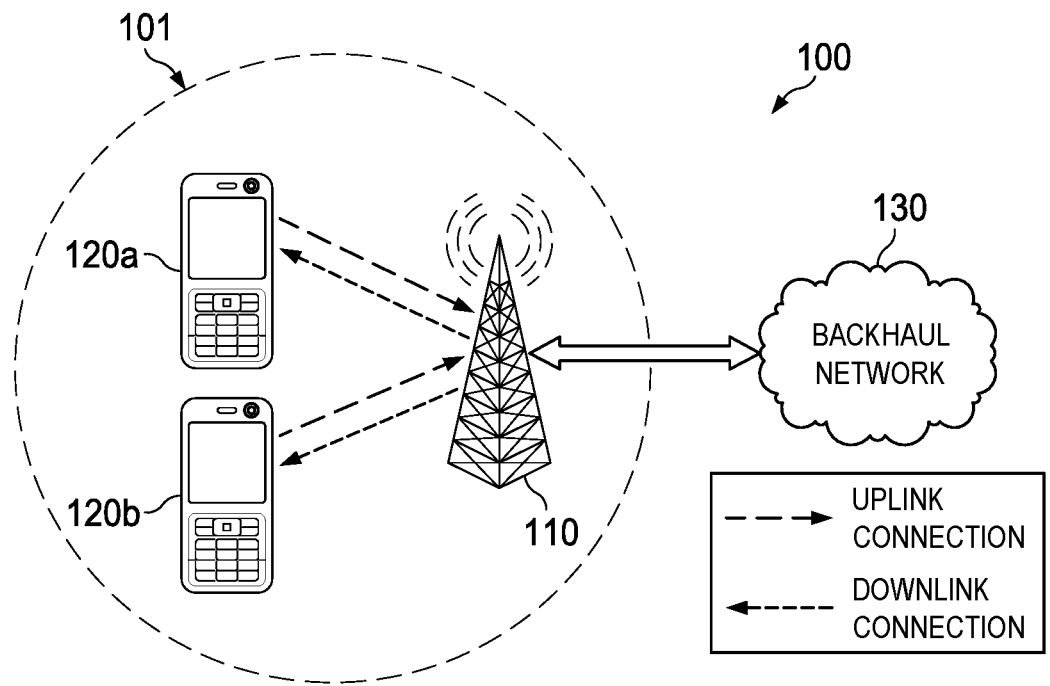
FIG. 1 is a diagram of an embodiment wireless communications network.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

In a conventional orthogonal multiple access scheme, signals carried on different communication links use different physical resource elements (REs, e.g., time, frequency, code, etc.) independently and orthogonally, where the different communication links are between different mobile devices and a base station. While relatively simple and implementation-efficient, orthogonal multiple access schemes suffer from relatively poorer spectrum efficiency. Implementation-friendly non-orthogonal multiple (NoMA) access methods are desired to improve the spectrum efficiency of wireless communication systems.

Advanced NoMA schemes are typically implemented using non-standard, NoMA-specific hardware, such as a NoMA-specific modulator and/or a NoMA-specific symbol-to-RE mapper. However, the hardware implementation of non-standard, NoMA-specific hardware is significantly more complex than a conventional hardware implementation of a conventional multiple access scheme.

Due to this increased complexity and expense, NoMA may be unsuitable for practical implementation in conventional wireless communications networks. For example, wireless telecommunication standards have historically mandated the use of standard modulators (e.g., BPSK, $\frac{\pi}{2}$ − $BPSK$, QPSK, 16-QAM, 64-QAM, 256-QAM, etc.) and have been reluctant to adopt advanced NoMA implementations. They have been wary of the associated complexity and expense of NoMA, despite NoMA's considerable theoretical performance benefits, such as improved spectral efficiency, reduced overhead, more flexible resource allocation, and improved interference mitigation.

Accordingly, embodiments of the present disclosure describe hardware-friendly examples of advanced NoMA implementations. These hardware-friendly NoMA implementations may be easily and readily used in next-generation wireless communications networks and transceiver chips, which can take advantage of the performance benefits of said NoMA implementations with little or no undesirable impact on hardware complexity.

Some NoMA schemes work well in some circumstances, while others in other circumstances. For example, some NoMA schemes can be realized with a legacy modulator, while others cannot be done straightforwardly. To benefit from different NoMA schemes in different circumstances and avoid redundant implementations, systems and methods are provided that integrate different NoMA schemes into one uniform apparatus.

In a radio communication system, a number of user equipments (UEs) are associated to a base station (BS) (more generally a base-station, Node-B, eNodeB, gNB, etc.). Some UEs may transmit the signals on the same radio resources simultaneously, introducing a collision at the BS receiver—this is known as "overloading". If the BS receiver can solve the collision, then the overloading would enhance overall system capacity. Overloading is especially useful on uplink transmission (radio transmissions from UEs to BS), as in the previous example. Overloading may also be applied in downlink transmission (radio transmissions from BS to multiple UEs).

Despite causing inevitable inter-user-interferences, which may penalize link-level performance, collisions may be mitigated by a receiver employing multi-user detection (MUD) and interference cancellation (IC) algorithm. If a receiver is well-designed for removing/mitigating interferences, the receiver trades for an overall system capacity gain at a cost of extra complexity paid for MUD and IC.

To remove interferences, a receiver's IC algorithm inputs channel decoding results back to MUD. The channel decoding results can be either decoded binary bits or "soft information" (e.g., LLR, log-likelihood ratio values). The IC uses the channel decoding results to reconstruct interferences and then remove the interferences from the input signals for the next iteration.

By a number of simulations, it is observed that the performance correlates with collision patterns that include number of colliding UEs, overloading ratio, modulation order, spectrum efficiency, transmission block size (TBS), receiver interference mitigation capability, FEC code rate, MA signature type (spreading, non-spreading, etc.), and so on. These parameters can be dynamically configured by an MA scheduler, which demands a wide range of choices and freedom for various configurations on the physical layer transmission. There are several NoMA schemes under the evaluation in New Radio (NR) wireless system. Each scheme has its own benefits under:

different application scenarios, for example massive machine type communications (mMTC), ultra reliable low latency communication (URLLC), enhanced mobile broadband (eMBB));

different coverage scenario, for example cell edge/cell center;

different waveforms, for example DFT-s-OFDM, CP-OFDM etc.

It is straightforward to use different hardware to produce individual NoMA signal and switch among them according to the situations, which would be costly in terms of UE implementation.

For example, a linear-spreading NoMA transmitter stores the entire set of the spreading sequences (patterns or tables) as a separate block. However, this hardware block becomes useless when other NoMA schemes such as SCMA are employed. In such straightforward approach where one block is switched off when one NoMA scheme is used while another block is switched on is an inefficient approach/use of hardware. As such, having a single transmission chain that has configurable block to produce different NoMA signals will maximize the hardware use and will provide a relatively inexpensive solution for large scale manufacturing/production.

FIG. 1 is a diagram of a network 100 for communicating data. The network 100 comprises a base station 110 having a coverage area 101, a plurality of user equipments (UEs) (e.g., UE 120a and UE 120b), and a backhaul network 130. As shown, the base station 110 establishes uplink (dashed line) and/or downlink (dotted line) connections with the UEs 120, which serve to carry data from the UEs 120 to the base station 110 and vice-versa. Data carried over the uplink/downlink connections may include data communicated between the UEs 120, as well as data communicated to/from a remote-end (not shown) by way of the backhaul network 130. As used herein, the term "base station" refers to any component (or collection of components) configured to provide wireless access to a network, such as a "Node B," an enhanced Node B (eNB), a next generation Node B (gNB), a transmit/receive point (TRP), a macro-cell, a femtocell, a Wi-Fi access point (AP), and other wirelessly enabled devices. Base stations may provide wireless access in accordance with one or more wireless communication protocols, e.g., 5th generation "New Radio" (NR), Long Term Evolution (LTE), LTE Advanced (LTE-A), High Speed Packet Access (HSPA), Wi-Fi 802.11a/b/g/n/ac, etc. As used herein, the term "UE" refers to any component (or collection of components) capable of establishing a wireless connection with a base station, such as a mobile device, a mobile station (STA), and other wirelessly enabled devices. In some embodiments, the network 100 may comprise various other wireless devices, such as relays, low power nodes, etc.

Embodiments of the disclosure provide methods and systems that realize a homogeneous NoMA transmitter that implements one or more legacy modulators. A legacy modulator can be any relatively low complexity, hardware implementation-friendly modulator, such as a modulator standardized and/or implemented in current technologies like Long Term Evolution (LTE) and WiFi. More particularly, a legacy modulator may be any single-dimensional modulator. Examples of single-dimensional modulators include BPSK, $$\frac{\pi}{2} - BPSK,$$

QPSK, 16-QAM, 64-QAM, 256-QAM, etc., as well as QAM modulators with different labeling (e.g., non-Gray labeling). The transmitter is homogeneous in the sense that that rather than having separate blocks/processing paths for different NoMA schemes, the same hardware can be configured to produce the signals of several different NoMA schemes.

In other embodiments, the homogeneous NoMA transmitter may additionally include one or more non-legacy modulators, such as a multi-dimensional modulator.

In general, this transmitter, which can, for example be implemented in the UE and/or the BS of FIG. 1, contains a bit-level processor, a modulation block, a phase/amplitude adjustor, and a modulated-symbol-to-resource element (RE) mapper. The transmitter can generate uplink signals of different NoMA schemes with a single hardware implementation. In addition, the provided approach allows some transmission adaptation and supporting signaling mechanism. A multi-branch generalization is also provided.

One or more of following problems are targeted and solved in various embodiments:
  Methods and systems to realize a homogeneous NoMA transmitter for supporting different NoMA transmission schemes, including multi-branch NoMA transmission.
  Methods and signalling mechanism to configure the homogeneous NoMA transmitter according to the different NoMA transmission schemes.

FIG. 2A is a block diagram of a NoMA transmitter provided by an embodiment of the disclosure. As shown, the embodiment transmitter includes an FEC encoder 200, a bit-level processor 202, a modulation block 204, a phase and/or amplitude adjustment block 206, and a symbol-to-RE mapper 208. Note that FIG. 2A shows the NoMA transmitter for an example operation to configure the NoMA features of the NoMA transmitter. Whereas FIG. 2B, described below, shows the same NoMA transmitter for an example operation to configure the MA signature of the NoMA transmitter.

The FEC encoder 200 may be any encoder configured to produce an error-detection/correction encoded bit stream, including (but not limited to) a Turbo encoder, a low-density parity-check (LDPC) encoder, and/or a polar encoder. An error detection/correction encoded bit stream may be a bit-stream that includes error correction bits (e.g., parity bits, FEC bits, etc.) and/or error detection bits (e.g., cyclic redundancy check (CRC) bits, etc.). The FEC encoder may apply error detection/correction encoding to an input data that was not previously encoded with error detection/correction. Alternatively, the FEC encoder 200 may apply error detection/correction encoding to an input data that already has some form of error detection/correction that is typically provided by an upper-layer function of whichever system implements the transmitter. The FEC encoder 200 generates a first bit-stream b of length m and optionally forwards the first bit-stream b to bit level processor 202. Alternatively, the input data is the first bit-stream b, and is received directly at the bit-level processor 202. This can be achieved either by omitting the FEC encoder 200 in its entirety, or alternatively, configuring an FEC encoder 200 that is present to pass the bits through unchanged.

The bit-level processor 202 performs a bit-level operation on the bit-stream b to generate a bit stream c that is the same length m as bit-stream b. The bit-level processor 202 may be, for example, circuitry or software configured to execute a combination of bit-level operations (e.g., Boolean functions) in order to accomplish various bit-level operations such as bit interleaving, bit scrambling, or both interleaving and scrambling. Optionally, the function may be defined by one or more input parameters. In addition to, or instead of, interleaving/scrambling, the bit-level operations may also include full or partial bit repetition, in which case the bit stream c would be a greater length than bit-stream b.

The bit-level processor 202 generates a second bit-stream c and forwards the second bit-stream to the modulation block 204. Alternatively, the second bit-stream 225 may be the same as the input data or the first bit stream, in which case the modulator(s) 230 may directly receive the input data or the first bit stream. This can be achieved either by omitting the bit-level processor in its entirety, or alternatively, configuring a bit-level processor 202 that is present to pass the bits through unchanged.

Bit stream c is then forwarded to the modulation block 204. The modulation block 204 comprises one or more modulators, and is described in further detail below. At the one or more modulators, one or more subsets of the bit-stream are modulated separately to create a corresponding symbol in a sequence of symbols that collectively form a sequence of symbols $s_1$ of length M. Typically, a symbol can be represented by one of many different complex-valued numbers, which each in turn represents a different binary number. In this way, a given modulator encodes one or more bits into a symbol. In other words, a given modulator includes a one-to-one mapping of unique bit sequences to unique symbols. The modulation block 204 may also be known as bit-to-symbol mapping function or a modulated symbol sequence generator.

The modulation block 204 may include a single modulator that modulates the respective sub-sets of bits in a sequential manner to generate each of the corresponding symbols of the sequence of symbols $s_1$. Alternatively, the modulation block 204 may include two or more modulators that modulate the respective sub-sets of bits in a parallel manner to generate the symbols of the sequence of symbols $s_1$. The modulators may be single-dimensional modulators, such as, but not limited to, BPSK, $$\frac{\pi}{2} - BPSK,$$

QPSK, and/or m-ary QAM modulator, e.g., a 4-QAM, 8-QAM, 16-QAM, 64-QAM, 256-QAM, 1024-QAM. QAM may be further sub-categorized by the "level" of modulation, i.e., by the length of the input bit sequence and the resulting number of possible different output symbols, such as 16-QAM, 64-QAM, and 256-QAM, for example. Additionally, QPSK may also be known as 4-QAM. The bit sequence-to-symbol mapping of a given modulator may be visually represented by a constellation diagram.

Figure 2C:
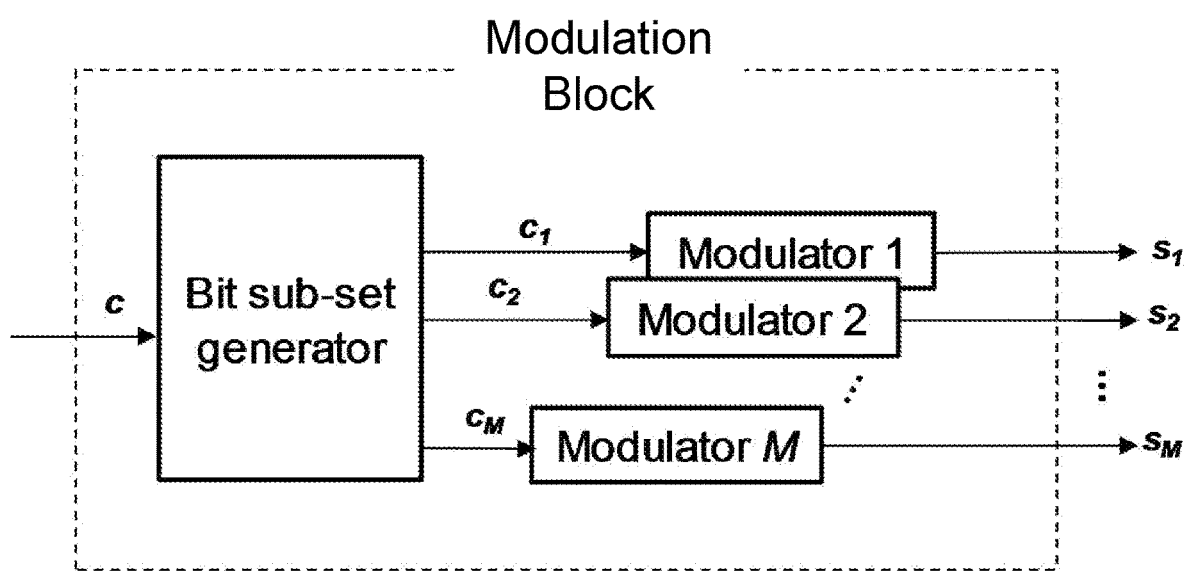
FIG. 2C is a block diagram of an example implementation of the modulation block of FIG. 2A.

FIG. 2C is a block diagram of an example modulation block showing a bit sub-set generator that receives bits c from the bit level processor 202, and generates bit subsets $c_1$, $c_2$, . . . , $c_M$. Each of the bit subsets is modulated by a respective modulator to produce respective symbol $s_1$, $s_2$, . . . , $s_M$. The modulators in the modulation block 204 may all be the same (e.g., all QPSK) or may be different (e.g., one QPSK, one 8-QAM, etc.).

Figure 3:
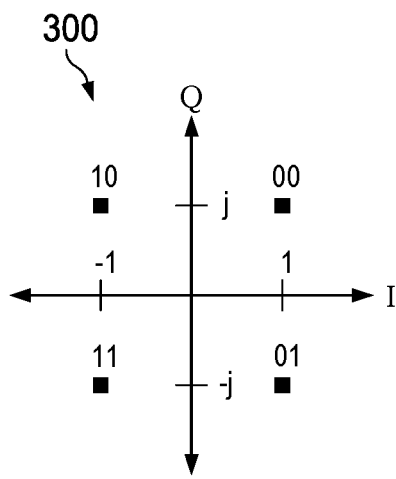
FIG. 3 is a constellation diagram of an example QPSK modulator.

FIG. 3 is a constellation diagram 300 of a QPSK (or 4-QAM) modulator. The x-axis (real values) represents an in-phase component of a signal while the y-axis (imaginary values) represents a quadrature component of the signal. The constellation diagram shows four different symbols, at (1, j), (−1, j), (−1, −j), and (1, −j). Each of the four symbols is mapped to respective inputs bit sequences (00), (10), (11), and (01). The distance of the symbol point from the origin of the constellation represents the amplitude of the signal waveform; the angle of the symbol point relative a reference represents a phase difference of the signal waveform. Thus, the QPSK-modulated signal comprises symbols with the same amplitude and different phase changes. Other modulation schemes may comprise different symbol points on the constellation, resulting in different amplitudes and phase changes. Optionally, the modulation mapping function may be defined by one or more input parameters.

Returning to FIG. 2A, the sequence of symbols $s_1$ is then forwarded to the phase and amplitude adjustment block 206 which produces as output a corresponding sequence of symbols $s_2$ also of length $M_2$ which have been phase and/or amplitude adjusted. The phase and/or amplitude adjustment block may be implemented as a multiplier and a diagonal matrix, although other implementations are possible as discussed below. Each term on the diagonal of the matrix has a respective amplitude and phase that is applied to the sequence of symbols $s_1$. Optionally, the phase and amplitude adjustment block behavior may be defined by one or more input parameters.

The sequence of symbols $s_2$ is then forwarded to the symbol-to-RE mapper 208, which maps the corresponding sequence of symbols to a set of REs in order to obtain a multiple access signal X of length N. The symbol-to-RE mapper 208 maps the sequence of symbols to a corresponding set of REs according to a given multiple access mapping rule, which results in the multiple access signal X. The multiple access signal X may be further processed in the transmitter before being ultimately transmitted to a receiver. For example, the multiple access signal may be converted to an analog waveform and propagated over the air. Optionally, the multiple access mapping rule may be defined by one or more input parameters.

Figure 4:
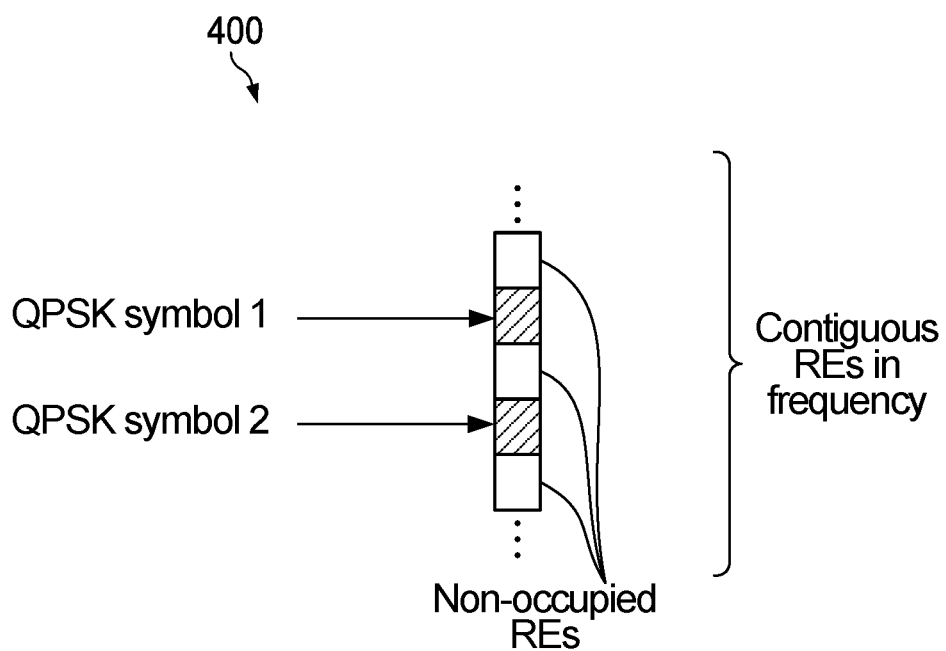
FIG. 4 is a schematic diagram of an example symbol-to-RE mapping operation.

FIG. 4 is a schematic diagram showing an example operation 400, by the symbol-to-RE mapper 208 of FIG. 2A, of mapping two QPSK symbols to specific REs. The location of the mapped REs may be specified by the one or more control signals $i_3$. The control signal may also specify whether the RE mapping relates to contiguous REs or non-contiguous REs. While FIG. 4 shows RE mapping in the frequency domain, the symbol-to-RE mapper 240 may also map the symbols to different REs in the time domain, as well as the frequency domain.

NoMA Configuration

For the purpose of allowing the transmitter to be configured to implement a specific NoMA scheme, the transmitter has NoMA configuration inputs. The NoMA configuration inputs determine which features in each block are to be used. A single feature or combination of features may produce a NoMA scheme. A "NoMA scheme" as used herein refers to specific a NoMA implementation, which may have an associated trade name such as sparse code multiple access (SCMA), multi-user shared access (MUSA), pattern division multiple access (PDMA), interleave-grid multiple access (IGMA), etc. (these are a non-limited set of possible examples). The NoMA configuration inputs may also indicate what parameters to use for that particular scheme (for example, spreading factor, sparsity ratio, etc). In a specific example, the NoMA configuration inputs include one or more of the following:

1) To configure the modulation block 204 for a specific NoMA scheme: $C_1(m, M_1, d)$, where:
   m=input bit length;
   $M_1$=modulation length (number of modulated symbols produced by the modulation block); and
   d=modulation order (number of distinct points in the constellation).

In case the modulation order of the modulators are different, d represents the vector of the modulation orders.

2) To configure the phase and amplitude adjuster 206 for the specific NoMA scheme: $C_2(M_1,M_2)$, where $M_1$=modulation length=number of symbols input to the phase and/or amplitude adjuster; and $M_2$=number of symbols output by the phase and/or amplitude adjuster.

In some embodiments, the phase and/or amplitude adjuster 206 can be represented by as $M_2 \times M_1$ matrix. In particular, this matrix may contain only 1 non-zero complex element in each row which specifies the phase and/or amplitude adjustment for the corresponding input symbol. For example, in the case of $M_1=M_2=M$, the phase and amplitude adjuster 206 can be represented by a diagonal M×M matrix.

In some other embodiments where $M_2 \neq M_1$, phase/amplitude adjustment not necessarily diagonal. For example, consider phase/amplitude adjustment by matrix representation $$\begin{bmatrix} \alpha_1 e^{j\phi_1} & 0 \\ 0 & 0 \\ 0 & 0 \\ 0 & \alpha_2 e^{j\phi_2} \end{bmatrix} \text{ and } s_1 \begin{bmatrix} s_{11} \\ s_{12} \end{bmatrix}$$

and then the output $s_2$ is sparse $$\begin{bmatrix} s_{11}\alpha_1 e^{j\phi_1} \\ 0 \\ 0 \\ s_{12}\alpha_2 e^{j\phi_2} \end{bmatrix}.$$

3) To configure the symbol to RE mapper 208 for a specific NoMA scheme: $C_3(M_2,N)$, where $M_2$=number of symbols input to the symbol-to-RE mapper, and N is the number of resources that the $M_2$ symbols are mapped to.

In some embodiments, configurations may be specified by different variables that are related or connected with those specified earlier. For example, sparse density ρ (i.e., ratio between $M_2$ and N or ρ=$M_2$/N) may be specified. In some configurations, other parameter may be implied. For example, m=2 μ$M_1$=1 may imply that d=$2^m$. Such relationship can be specified in specific NoMA feature configurations to reduce the signalling overhead of that scheme and the system. In some embodiments, N is equal to the total number of available REs and $M_2$ denotes the total number of symbols to be filled in the available REs using the symbol to RE mapper function.

Although not shown in FIG. 2A, the NoMA configuration may also be used to configure specific feature(s) of the FEC block 200 and bit level processor block 202. For example, FEC code rate may be configured for enabling NoMA features. In another example, FEC code rate may be configured and/or adjusted by coded bit repetition (i.e., repetition code). In another example relating to bit level operator is the application of stream/UE specific interleaving/bit scrambling. Such configurations may be associated with MA signature(s). Such configuration may be implied from or associated with NoMA feature(s) or NoMA scheme(s).

NoMA configurations may relate to each other. For example, configuration $C_1(m,M_1,d)$ may imply configuration $C_3(M_2,N)$ or parameters values of $M_2$ or N.

Figure 2D:
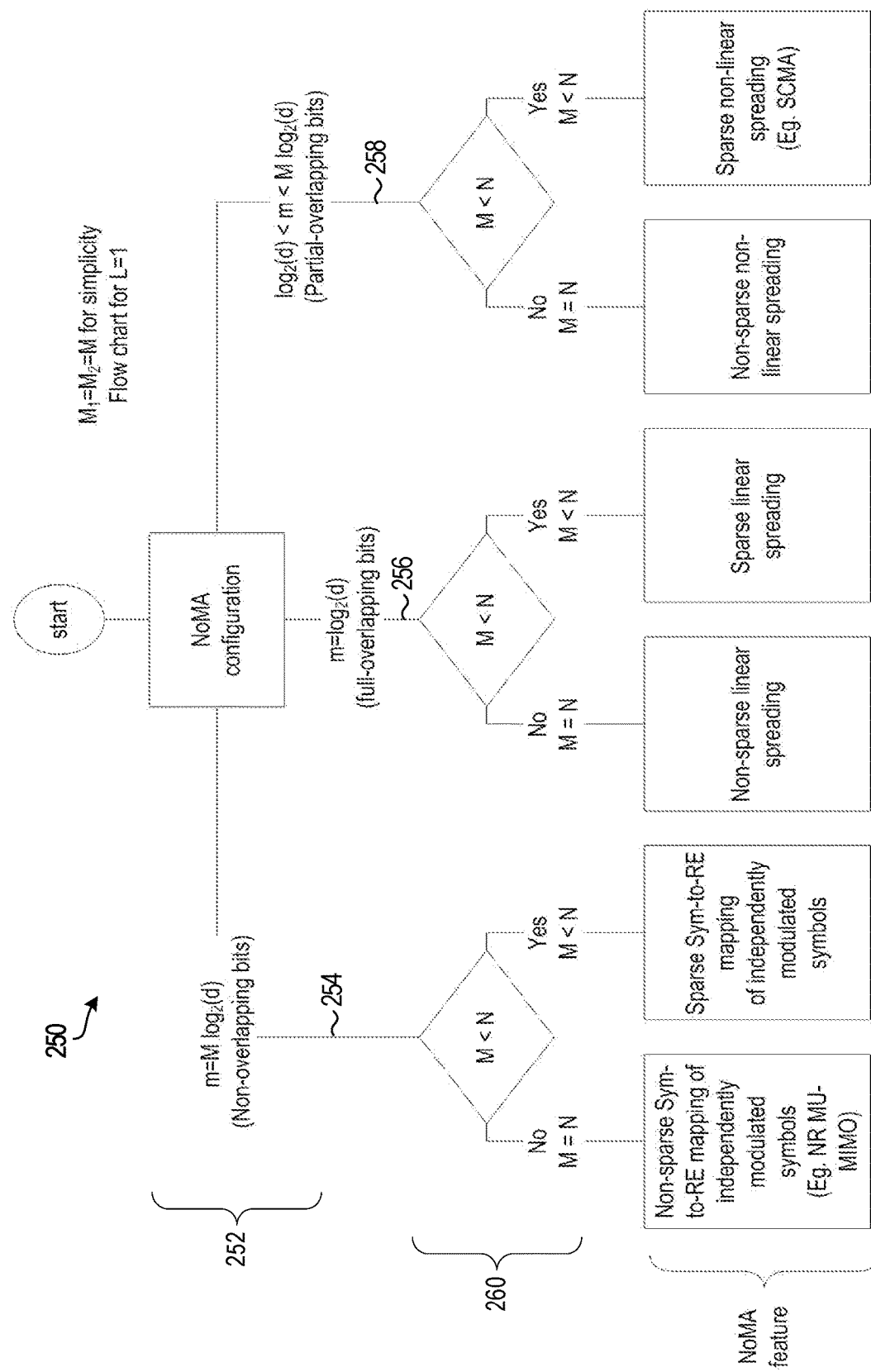
FIG. 2D is a flowchart of an example method of NoMA configuration.

FIG. 2D shows how input parameters M,N and d can be associated with different NoMA features. For simplicity of presentation, $M_1=M_2=M$ is assumed in FIG. 2D and it is also assumed that all modulators in the modulator block have the same order.

In the example flow chart 250 of FIG. 2D, the first decision level indicates whether the NoMA scheme includes a spreading feature, and if so, which type of spreading feature. Three specific options are shown. For option 254, m=M×$\log_2(d)$, in which case bits mapped to modulated symbols are non-overlapping. For option 256, m=$\log_2(d)$, in which case bits are fully overlapped between the modulated symbols. For option 258, $\log_2(d)<m<M \log_2(d)$, in which case there is partial overlapping between the bits mapped to modulated symbols.

The second decision level 260 indicates whether the NoMA scheme includes sparsity (sparse density). For each branch, 254, 256, 268, there is a respective option that does not include sparsity (M=N), and a respective branch that does include sparsity (M<N) In the example flow chart 250, the combination of the two decision levels 252 and 260 results in six distinct NoMA features, which may be used to configure the NoMA transmitter.

The flow chart 250 may be logic that is implemented in the above-described blocks of the NoMA transmitter of FIG. 2A or that is implemented in a separate logical block in the transmitter.

Many specific examples of specific NoMA configurations are detailed below.

MA Signature Configuration

Referring now to FIG. 2B, shown is the transmitter of FIG. 2A, with a different set of inputs than those shown in FIG. 2A. Shown is a combination of the MA signature configuration inputs of the bit-level processor 202, the modulation block 204, the phase and/or amplitude adjuster 206, and the symbol-to-RE mapper 208, and potentially other parameters, that collectively allow for a list of options for a given NoMA configuration that each UE can select from or be assigned, to make the NoMA signal processing operations UE-specific (or stream/layer/branch specific in a multi-stream/layer/branch implementation) and facilitate UE detection (or facilitate stream/layer/branch detection). In a specific example, the MA signature configuration inputs include one or more of the following:

1) For the purpose of configuring a specific MA signature associated with a specific interleaving pattern and/or scrambling sequence of a set of possible patterns and sequences, the bit-level processor 202 may receive one or more control signals $i_1$ for assigning the specific interleaving pattern and/or scrambling sequence.

2) For the purpose of configuring the specific MA signature associated with a specific set of phase and amplitude adjustments from $M_1$ input symbols to $M_2$ output symbols of a pool of possible sets of such phase and/or amplitude adjustments, the phase and/or amplitude adjuster 206 may receive one or more control signals $i_2$ for selecting and/or configuring the specific set of phase and/or amplitude adjustments.

3) For the purpose of configuring the specific MA signature associated with a specific $M_2$ symbol-to-N resource mapping from a set of possible such mappings, the symbol-to-RE mapper 208 may further receive one or more control signals $i_3$ for selecting and/or configuring the mapping.

Although not shown in FIG. 2B, the MA signature may also be input to the FEC block 200 and the modulator block 204. Such inputs may be implied from or associated with NoMA feature(s) or a NoMA scheme(s).

A given implementation may not require MA signature specific configurations for all of the bit-level processor, the phase and amplitude adjuster, and the symbol-to-RE mapper. More generally, in the above example, the MA signature may be identified by, or define, one or more of the MA signature inputs $i_1$, $i_2$, $i_3$ etc. Configuring one or more of the bit-level processor 202, the modulation block 204, the phase and/or amplitude adjuster 206, and the symbol-to-RE mapper 208, with the MA signature inputs serves to apply the MA signature to input data for generating the multiple access signal X, which can then be transmitted in the multiple access communication system, and decoded by a receiver in the multiple access communication system.

The MA signature allows the multiple access communication system to support multi-user communications and/or multi-stream communications. Multi-user communications refers to communications that are specific to a user device or group of user devices. Multi-user communications may use the MA signature to reduce or manage interferences caused by simultaneous transmissions of different messages over the same shared physical resources (of time and frequency). If these interferences can be adequately reduced or managed, the multi-user communications may help improve the overall system capacity of a communications system.

Multi-stream communications refers to communications that are specific to a data stream, which a more general concept than multi-user communications. For example, different users can communicate using different data streams, or one user can increase its throughput by using multiple data streams. Multi-stream communications may also be known as multi-layer or multi-branch communications.

Multi-user communications may also include multi-user detection. For example, in multi-user detection, the MA signature enables user-specific signal processing at each UE transmitter. The user-specific signal processing may impart a certain structure to the generated signals, which facilitates the multi-user detection at a receiver.

FIGS. 6 to 9 are block diagrams of NoMA transmitters that feature multi-branch operation. The features described in the context of the single branch transmitter of FIG. 2A also apply to the multi-branch embodiments, either on a per-branch basis, or to the entire transmitter.

Figure 6:
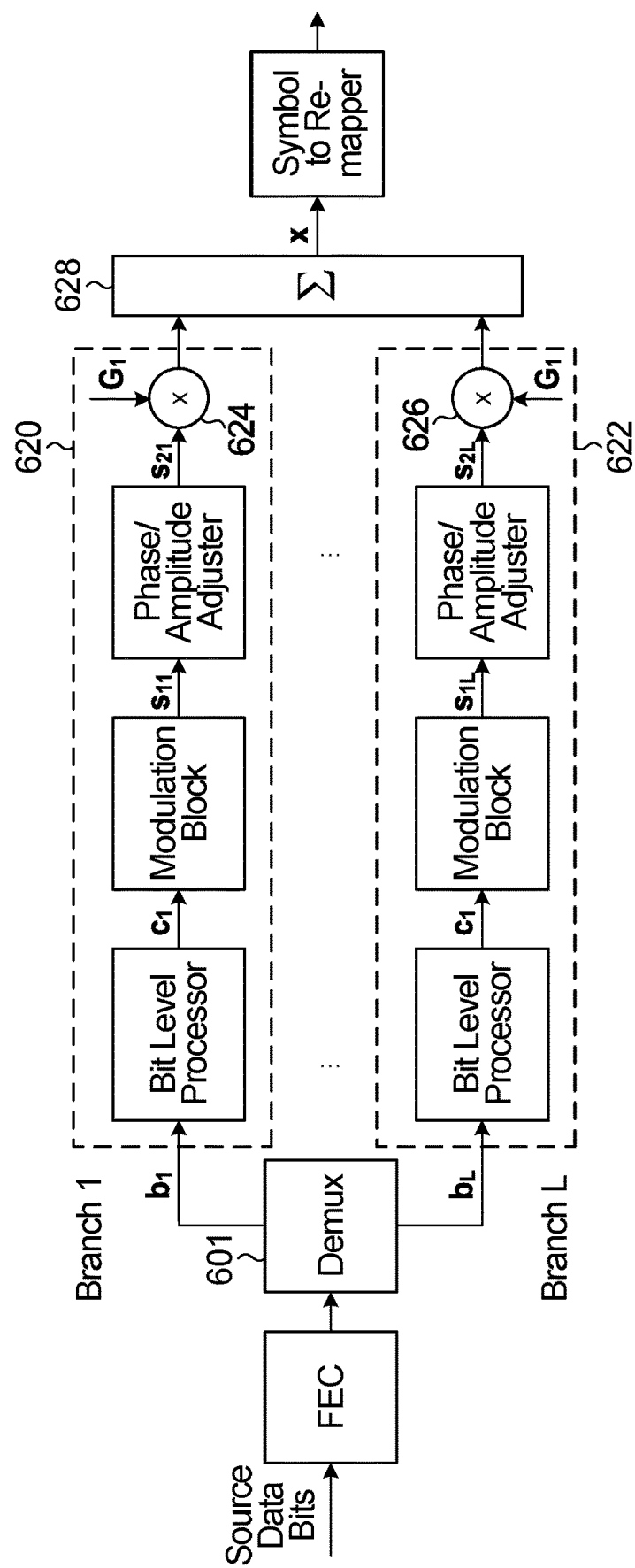
FIG. 6 to FIG. 9 are diagrams of embodiment transmitters for transmitting a signal in the wireless communications network, with multi-branch configuration.

FIG. 6 is a block diagram of a first NoMA transmitter provided by an embodiment of the disclosure that features a multi-branch operation. The NoMA transmitter of FIG. 6 differs from that of FIG. 2A in that there is a demux block 601 that splits FEC encoded data bits into multiple streams $b_1, \ldots, b_L$. Each of the streams is then processed in respective processing path 620, . . . , 622 that includes a bit level processor, a modulation block, and a phase/amplitude adjuster, as in the FIG. 2A example. The phase/amplitude adjuster in each processing path 620, . . . , 622 outputs a respective symbol stream $S_{21}, \ldots, S_{2L}$. A respective gain $G_1, \ldots, G_L$ is applied to each of the symbol streams $s_{21}, \ldots, s_{2L}$ with multipliers 624, . . . 626. The gain adjusted symbol streams are combined with combiner 628, and the output is processed by the symbol to RE mapper. Each of the branches is configurable as in the embodiment of FIG. 2A. In addition, in some embodiments, the number of branches (L) is configurable as part of the NoMA configuration/adaptation process.

Figure 7:
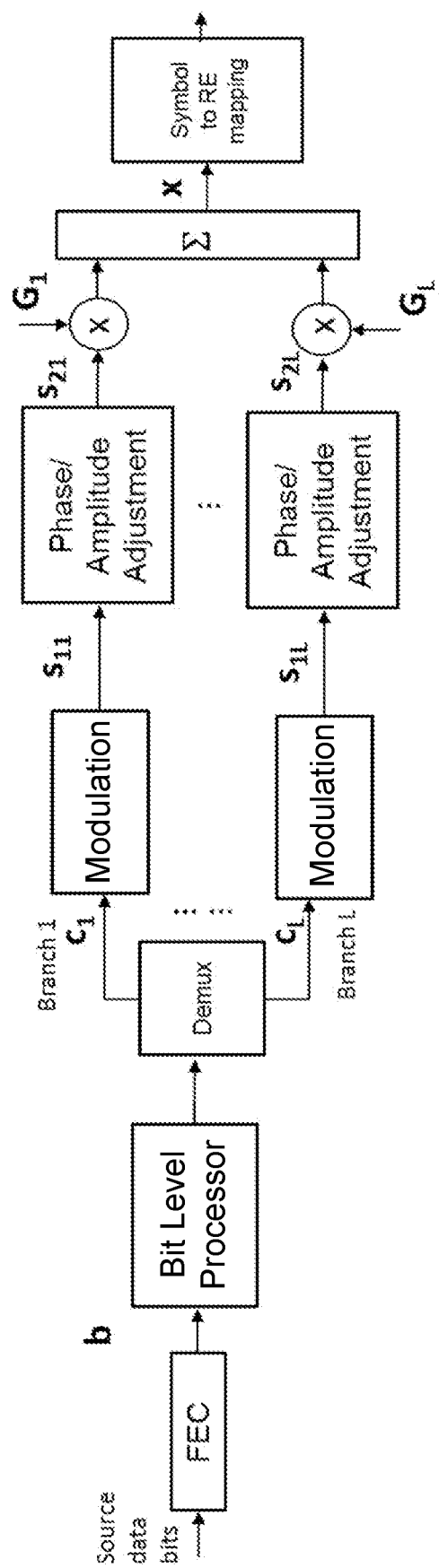

Another example is shown in FIG. 7, in which the de-multiplexing operation takes place after the bit level processing.

Figure 8:
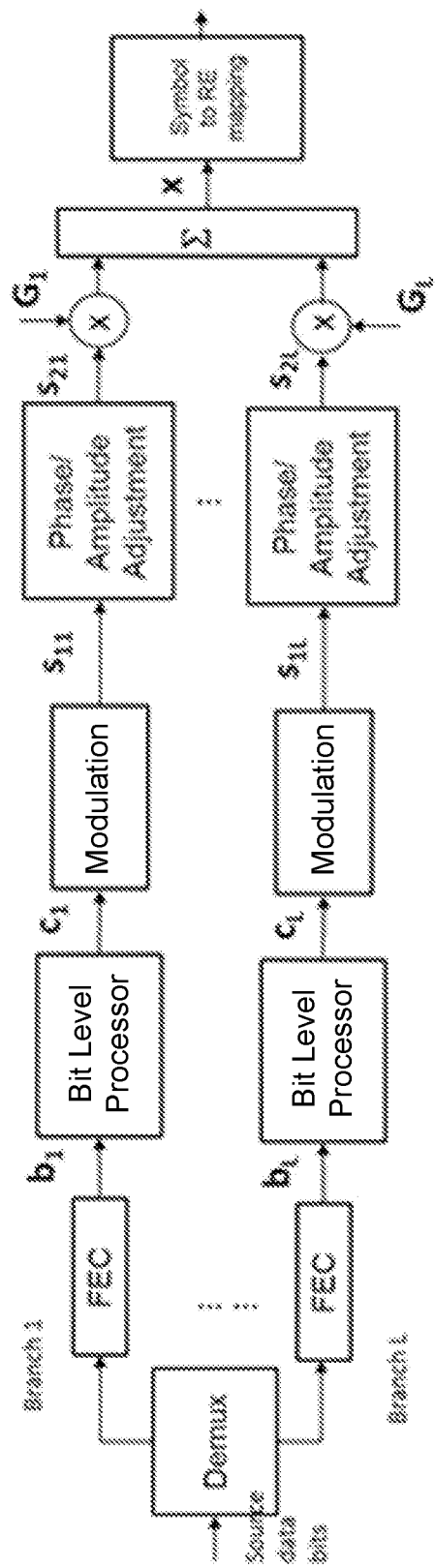

Another example is shown in FIG. 8, in which the de-multiplexing operation takes place prior to FEC encoding.

Figure 9:
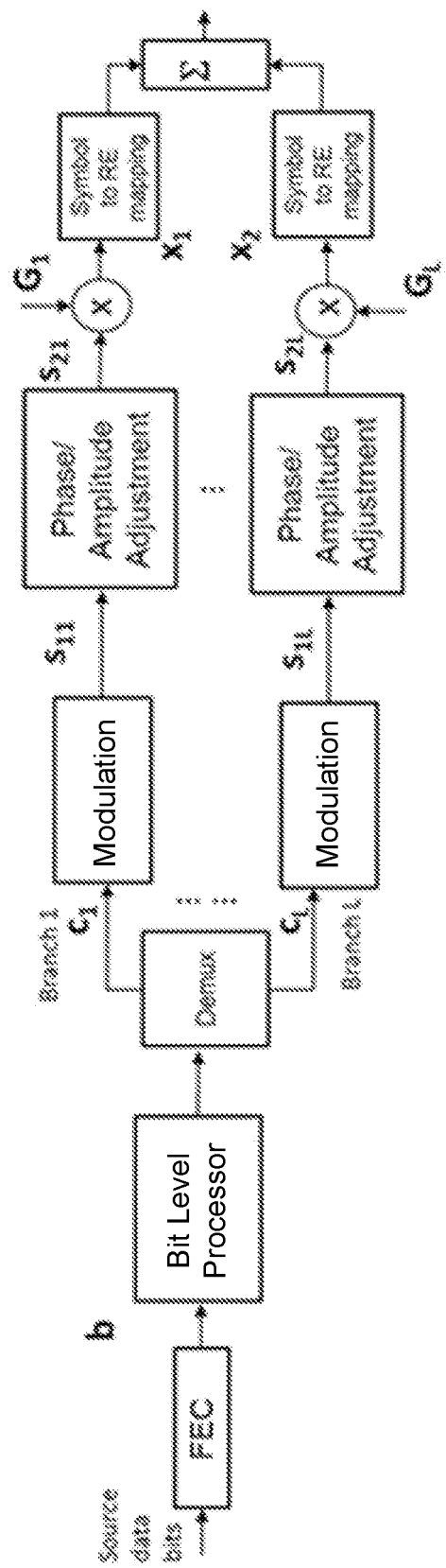

Another example is shown in FIG. 9, in which the de-multiplexing operation takes after bit level processing, and featuring branch specific symbol-RE mapping, for example a branch specific sparse mapping.

The multi-branch NoMA transmitter diagrams shown in FIGS. 6 to 9 are a non-limiting and different combinations and re-arrangements of the block are possible. An expert in the domain is able to recognize that the functionality may be achieved by different combinations and re-arrangements.

As previously mentioned, the described transmitter has a flexible structure that allows it to be configured to produce the uplink signals of different NoMA schemes. Various example configurations will now be described but it should be understood that this is just a small subset of the configurations that are possible.

Configuration 1—Linear-Spreading-Based NoMA Scheme

The transmitter can be configured to realize a linear spreading-based NoMA transmitter by repeatedly using a same modulator on the bit stream c of length m. More specifically, the bits in c are repeated several times in a pre-defined or specified way before inputting them to a modulator within the modulation block 204. In this configuration, (to produce linear-spreading-NoMA scheme), the mapping block length (M), the number of repetition or replications, is the SF (spreading factor) in a linear-spreading-based NoMA scheme. The SF parameter is configurable.

It should be appreciated that MA signatures may take different forms depending upon the multiple access scheme that is being implemented. "Spreading" is an example effect of an MA signature. In other words, the MA signature may comprise a definition for applying a spreading sequence to input data. Interleaving (of bits or symbols) is another example effect of an MA signature. A particular symbol-to-RE mapping pattern is yet another example effect of an MA signature.

In the present disclosure, spreading is defined to encompass operations that associate a value of at least one input bit in the transmission chain, with two or more symbols generated in the transmission chain. That is, the value of the one input bit becomes associated with two or more symbols transmitted over physical resources.

Spreading operations may be classified as linear or non-linear. Linear spreading may refer to an operation that creates a relationship between symbols in a sequence of symbols, where the relationship is independent of input bit values of the input bit-stream such that a change in the input values does not affect the relationship between the symbols. By way of example, an embodiment linear spreading technique may effectuate a phase difference between two symbols that remains consistent across all combinations of input bit-values. Non-linear spreading may refer to an operation that creates a relationship between symbols in a sequence of symbols, where the relationship depends on input bit values of the input bit stream such that different relationships between symbols are formed for different combinations of input bit-values.

By repeating the pre-modulator bits exactly SF times, the method in Configuration 1 realizes a full overlapping linear-spreading NoMA scheme. If a fully overlapping M-bit sequence to the modulator is used, the same symbol from the modulator is actually repeated. For an example of m=2 and M=2, defining $c=(c_0,c_1)$, we have two identical symbols $s_1=QPSK(c_0,c_1)$ and $s_2=QPSK(c_0,c_1)$, because $(c_0,c_1)$ gets repeated twice (duplicated).

The pre-modulator repetition and replication can be input in sequence to a single modulator, or into parallel modulator entities.

The repetition or replication sequences or patterns of length SF should match with the ensuing post-modulator phase/amplitude adjustor in the sense that the combined operation of the modulator and the phase/amplitude adjuster produces the linear spreading desired. There is a relationship or association between the two to produce the desired output. As detailed previously, in some embodiments, the operation of phase and/or amplitude adjustment of the symbol sequence $s_1$ can be performed by multiplication of $s_1$ by a diagonal matrix. An example of a set of possible diagonal matrices for the case of M=2 can be given as follows, with a mapping to a corresponding index $i_3$:

TABLE 1

Phase/Amplitude adjustment for spreading length 2 sequences

| Index | Phase and/or amplitude adjustment with $a = \frac{1}{\sqrt{2}} + j\frac{1}{\sqrt{2}}, j = \sqrt{-1}$ |
|---|---|
| 1 | $\begin{bmatrix} 1 & 0 \\ 0 & 1 \end{bmatrix}$ |
| 2 | $\begin{bmatrix} 1 & 0 \\ 0 & -1 \end{bmatrix}$ |
| 3 | $\begin{bmatrix} 1 & 0 \\ 0 & j \end{bmatrix}$ |
| 4 | $\begin{bmatrix} 1 & 0 \\ 0 & -j \end{bmatrix}$ |
| 5 | $\begin{bmatrix} 0 & 1 \\ 1 & 0 \end{bmatrix}$ |
| 6 | $\begin{bmatrix} 0 & 1 \\ -1 & 0 \end{bmatrix}$ |
| 7 | $\begin{bmatrix} 0 & 1 \\ j & 0 \end{bmatrix}$ |
| 8 | $\begin{bmatrix} 0 & 1 \\ -j & 0 \end{bmatrix}$ |
| 9 | $\begin{bmatrix} 1 & 0 \\ 0 & a \end{bmatrix}$ |
| 10 | $\begin{bmatrix} 1 & 0 \\ 0 & -a \end{bmatrix}$ |
| 11 | $\begin{bmatrix} 1 & 0 \\ 0 & ja \end{bmatrix}$ |
| 12 | $\begin{bmatrix} 1 & 0 \\ 0 & -ja \end{bmatrix}$ |
| 13 | $\begin{bmatrix} 1 & 0 \\ 0 & 0 \end{bmatrix}$ |
| 14 | $\begin{bmatrix} 0 & 0 \\ 0 & 1 \end{bmatrix}$ |

Note that the all-zero column in the index 13 and 14 generates a kind of sparsity (nullity/zero symbol).

More generally, a number of phase/amplitude adjustment matrices can be included in a candidate pool each with a respective index. Depending upon the size of the MA signature pool size required, it may not be required to use all of the indices.

There are several alternative representations or names of the matrix representation of the phase and/or amplitude adjustment that can be applied for any of the embodiments described herein. One option is as in a table above mostly for mathematical convenience and compact representation. An alternative representation is symbol scrambling, i.e., multiplication of the symbol sequence $s_1$ by another symbol sequence symbol-by-symbol. For example, $s_1$ with phase and/or amplitude adjustment described in index 1 matrix $$\begin{bmatrix} 1 & 0 \\ 0 & a \end{bmatrix}$$

can be written as $s_1 \cdot u_i$ where $u_i = [1\ a]$ and the operation "·" represents element-by-element multiplication. Yet in another alterative representation, vector multiplication can be used, i.e., $s_1 = [s_{11}\ s_{12}]^T$ and $v_i = [v_1\ v_2]^T$ and phase and/or amplitude adjustment described by $v_i^T \circ s_1$ where "o" represents Hadamard product.

TABLE 2

Phase/Amplitude adjustment for spreading length 4 sequences

| Index | Phase and/or amplitude adjustment with diag(Δ) where j = $\sqrt{-1}$ and diag(.) is the diagonal matrix input argument Δ |
|---|---|
| 1 | [1 1 1 1] |
| 2 | [1 1 −1 −1] |
| 3 | [1 −1 1 −1] |
| 4 | [1 −1 −1 1] |
| 5 | [1 1 −j j] |
| 6 | [1 1 j −j] |
| 7 | [1 −1 −j −j] |
| 8 | [1 −1 j j] |
| 9 | [1 −j 1 j] |
| 10 | [1 −j −1 −j] |
| 11 | [1 j 1 −j] |
| 12 | [1 j −1 j] |
| 13 | [1 −j −j −1] |
| 14 | [1 −j j 1] |
| 15 | [1 j −j 1] |
| 16 | [1 j j −1] |
| 17 | [1 1 1 −1] |
| 18 | [1 1 −1 1] |
| 19 | [1 −1 1 1] |

TABLE 2-continued

Phase/Amplitude adjustment for spreading length 4 sequences

| Index | Phase and/or amplitude adjustment with diag(Δ) where $j = \sqrt{-1}$ and diag(.) is the diagonal matrix input argument Δ |
|---|---|
| 20 | [1 −1 −1 −1] |
| 21 | [1 1 −j −j] |
| 22 | [1 1 j j] |
| 23 | [1 −1 −j j] |
| 24 | [1 −1 j −j] |
| 25 | [1 −j 1 −j] |
| 26 | [1 −j −1 j] |
| 27 | [1 j 1 j] |
| 28 | [1 j −1 −j] |
| 29 | [1 −j −j 1] |
| 30 | [1 −j j −1] |
| 31 | [1 j −j −1] |
| 32 | [1 j j 1] |
| 33 | [1 1 1 −j] |
| 34 | [1 1 −1 j] |
| 35 | [1 −1 1 j] |
| 36 | [1 −1 −1 −j] |
| 37 | [1 1 −j 1] |
| 38 | [1 1 j −1] |
| 39 | [1 −1 −j −1] |
| 40 | [1 −1 j 1] |
| 41 | [1 −j 1 1] |
| 42 | [1 −j −1 −1] |
| 43 | [1 j 1 −1] |
| 44 | [1 j −1 1] |
| 45 | [1 −j −j j] |
| 46 | [1 −j j −j] |
| 47 | [1 j −j −j] |
| 48 | [1 j j j] |
| 49 | [1 1 1 j] |
| 50 | [1 1 −1 −j] |
| 51 | [1 −1 1 −j] |
| 52 | [1 −1 −1 j] |
| 53 | [1 1 −j −1] |
| 54 | [1 1 j 1] |
| 55 | [1 −1 −j 1] |
| 56 | [1 −1 j −1] |
| 57 | [1 −j 1 −1] |
| 58 | [1 −j −1 1] |
| 59 | [1 j 1 1] |
| 60 | [1 j −1 −1] |
| 61 | [1 −j −j −j] |
| 62 | [1 −j j j] |
| 63 | [1 j −j j] |
| 64 | [1 j j −j] |

As before, a number of phase/amplitude adjustment matrices can be included in a candidate pool each with a respective index. Depending upon the size of the MA signature pool size required, it may not be required to use all of the indices. In a similar fashion, phase/amplitude adjustment for different spreading lengths can be performed.

With this configuration, it should be appreciated that linear spreading has been achieved by the use of amplitude and phase adjustment block with repeated use of a modulator and bit level operations.

Configuration 2—Non-Linear-Spreading-Based NoMA Scheme

In this configuration, the transmitter is configured to realize a non-linear-spreading-based NoMA scheme. This configuration is achieved by using modulators multiple times where overlapping sub-sets of bits (the intersection of the sets is not empty or $S_1 \cap S_2 \neq \emptyset$) from bit stream c are used by the modulator. At least one sub-set of bits from c of size is less than m (this is to exclude the full overlapping subsets of bits). In particular, with reference to FIG. 2A, the i-th symbol and the j-th symbol of the symbol sequence $s_1$, denoted by $s_{1i}$ and $s_{1j}$ respectively, are generated by $s_{1i}=f_i(c_i)$ and $s_{1j}=f_j(c_j)$, where $c_i$ and $c_j$ denote two subsets of the input bit stream c and $f_i$ and $f_j$ denote the modulator function which can be the same or different (for example $f_i$ can resemble QPSK modulation while $f_j$ resembles 16QAM modulation). The overlapping condition implies that there exists $1 \leq i,j \leq M$, $i \neq j$, such that $c_i \cap c_j \neq \emptyset$ and also there exists $1 \leq i,j \leq M$, $i \neq j$, such that $c_i \neq c_j$. This can also be described as repeated use of modulators that take the bit sequences that are partial overlapping as input. This approach generates NoMA signals with non-linear spreading.

For example, a 16-QAM modulator uses two sub-sets of bits of length 4-bit from a 6-bit stream to produce two symbols $s_{11}$, $s_{12}$ where $s_1=[s_{11}\ s_{12}]^T$. Particularly, consider $c=[b_0\ b_1\ b_2\ b_3\ b_4\ b_5]$ and two sub-set of bits of 4 bits each. i.e., $c_1=[b_0\ b_1\ b_2\ b_3]$ and $c_2=[b_0\ b_1\ b_4\ b_5]$ (bits $b_0$, $b_1$ are common in $c_1$ and $c_2$) produces two 16-QAM standard modulated symbols.

The 16-QAM modulation can be expressed as:

$$\partial(b_0, b_1, b_2, b_3) = \frac{1}{\sqrt{10}}\{(1-2b_0)[2-(1-2b_2)] + j(1-2b_1)[2-(1-2b_3)]\}.$$

Let 16-QAM symbols be generated by $s_{11}=\partial(b_{0,1},b_2,b_3)$ and $s_{12}=\partial(b_0,b_1,b_4,b_5)$. Observe that $b_0$ and $b_1$ are mapped to the I and Q components respectively in both the symbol.

Alternatively, the common bits of $c_1$ and $c_2$, i.e., $b_0$ and $b_1$, can be mapped differently, i.e., $b_0$ mapped to I component in one symbol and Q component in the other signal.

Yet in another approach, $s_{11}=\partial(b_0, b_1,b_3,b_5)$ and $s_{12}=\partial(b_2, b_4,b_3,b_5)$ in which common bits are $b_3$ and $b_5$.

In some embodiments, configuration 2 can be used to generate non-linear spreading based 16-point SCMA codebook.

The modulation operation can optionally be followed by described phase/amplitude adjustment block. The inclusion of this block allows expansion of the signature space which is critical for high overloading systems such as mMTC/eMBB scenarios.

Configuration 3—Non-Linear-Spreading-Based NoMA Scheme

Figure 10:
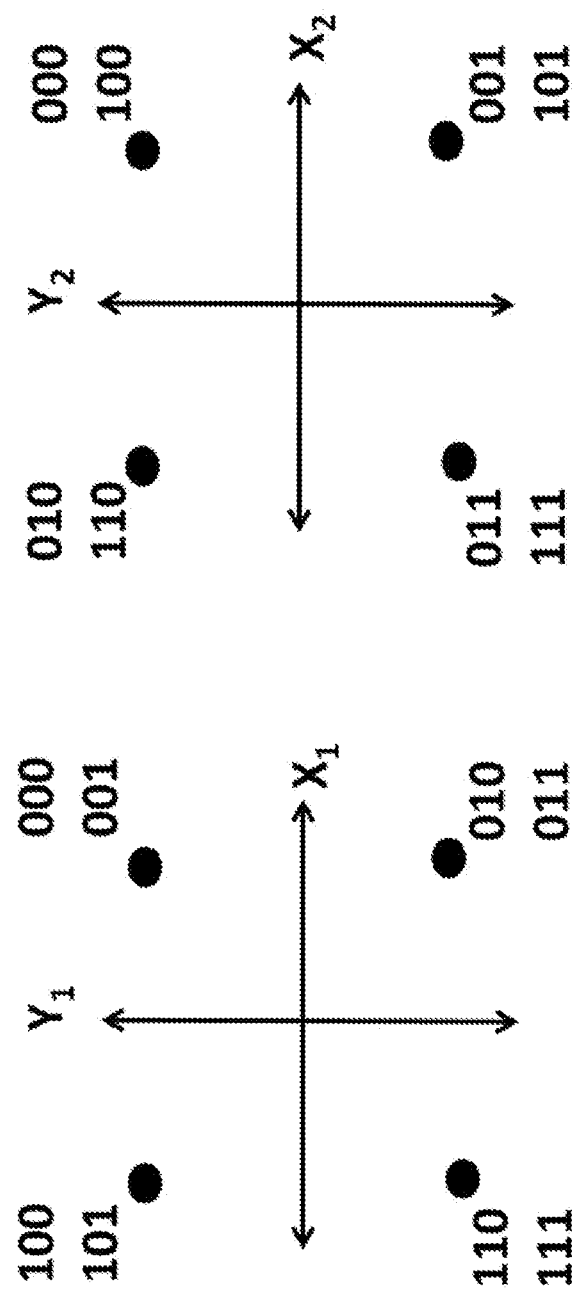
FIG. 10 is an example of using two QPSK modulators to generate an 8 point codebook mapping.

In this configuration, QPSK modulators are used multiple times where sub-sets of bits from bit stream $c=[b_0\ b_1\ b_2]$ are input to the modulator similar to Configuration 2. In this case of m=3 and M=2, there are two symbols $s_1$=QPSK($b_0$, $b_1$) and $s_2$=QPSK($b_2,b_1$) and the common bit is $b_0$. The QPSK modulation can be used to produce two sub-sets of bits of length 2-bit from a 3-bit input to produce two symbols $s_{11}$, $s_{12}$ where $s_1=[s_{11}\ s_{12}]^T$. For example, consider $c=[b_0\ b_1\ b_2]$ and two sub-set of bits of 2 bits each. i.e., $c_1=[b_0\ b_1]$ and $c_2=[b_1\ b_2]$ produce two 4-QAM standard modulated symbols. This approach produces an 8-point SCMA codebook. An example mapping is shown in FIG. 10.

The modulation operation can be followed by the phase/amplitude adjustment matrix similar to the alterative 1 in the Configuration 1. Similar to Configuration 1, the implementation of more than one modulator may be appealing for lower delay and cost benefits.

As described in Configuration 1, the provided approach enables the use of less complex hardware for generating different complex NoMA signals, including the non-linear spreading used in SCMA.

Configuration 4—NoMA Transmitter that Produces Signal from Disjoint Sub-Set of Input Bits.

This configuration is achieved by using modulators multiple times where non-overlapping (disjoint or the intersection of the sets is empty or set 1∩set 2=∅)) sub-sets of bits from bit stream c are input to the modulator.

Modulated symbols corresponding to the sub-sets with the same number of bits can be generated by repeated use of the same modulator or by multiple modulators in parallel.

Each sub-set may vary in the number of bits (i.e., not necessarily the same size) and input to an appropriate modulator for that number of bits generates the corresponding modulated symbol. For example, a sub-set of size 2-bits is input to a QPSK modulator while another sub-set of 1-bit is sent to a BPSK or $\pi/2$-BPSK modulator. Note that UE mobile device or BS hardware is capable of performing multiple modulation functions.

This approach of using non-overlapping sub-sets of input bits can be used to generate symbols streams suitable for conventional orthogonal multiple access (OMA) transmissions. This possibility of generating both OMA and NoMA signals is useful because in some usage scenarios one scheme is preferred over the other. Thus, NoMA feature-supported devices will be able to produce OMA signals for backward compatibility.

Signals that are generated by non-overlapping sub-sets of input bits can be used in conjunction with some other bit-level processing such as interleaving or scrambling to generate NoMA signals, i.e., the operation associated with a MA signature. In some other embodiments, symbol level processing such as symbol scrambling or sparse mapping can be used to generate NoMA signals. Such bit-level or symbol-level processing may associate with a portion or the whole of a MA signature. Combination of such bit-level or symbol level processing may associate with a portion or the whole of a MA signature. In some embodiments, symbol scrambling or sparse mapping may be performed on small blocks of symbols. In other scenarios, scrambling sequence or sparse mapping may be defined for the entire transmission block.

In some scenarios, both the symbol scrambling and linear spreading are performed by the phase/amplitude adjuster block. In some scenarios, scrambling sequence length is different from spreading sequence length SF. For example, in Table 2, the phase/amplitude adjustment suitable for spreading length SF 4 is defined and scrambling sequence length can be different from 4. This requires specific arrangements in phase/amplitude adjuster block. For example, when symbol scrambling sequence length is $kM_1$, scrambling is performed on k number of $s_1$ symbol sequences that are phase and/or amplitude adjusted. Alternatively, phase/amplitude adjuster block may be implemented by two functional blocks one output connected to other with appropriate dimensions and one producing the spreading effect and the other producing the scrambling effect.

Consider $c=[b_0\ b_1\ b_2\ b_3]$ and two sub-set of bits of 2 bits each. i.e., $c_1=[b_0\ b_1]$ and $c_2=[b_2\ b_3]$ where two streams $c_1$ and $c_2$ are disjoint (i.e., non-overlapping). Both $c_1$ and $c_2$ are input to QPSK modulator because both $c_1$ and $c_2$ have two bits each. If any, bit-interleaving or scrambling or other bit-level processing can be performed to produce an MA signature. If any, symbol scrambling or symbol sparse mapping can be performed to produce an MA signature. If any, a combination of bit- and symbol-level processing such as bit-interleaving with sparse symbol mapping or bit-interleaving with symbol scrambling or bit-scrambling with symbol scrambling or symbol scrambling with symbol sparse mapping can be performed to produce an MA signature. In some embodiments, combination of bit-level processing such as bit-interleaving and bit-scrambling may be used. In some embodiments, combination of symbol-level processing such as sparse mapping with symbol scrambling may be used. Such combination operations can be applied for the entire block of bits or symbols or a block of few number of bits/symbols.

The phase/amplitude adjustment block can be used to produce symbol scrambling or symbol sparse mapping or both and such operations are associated with a MA signature or not. For example, $s_1$ and $s_2$ corresponds to bits $c_1$ and $c_2$ respectively, can be scrambled by scrambling sequence $e_1$ and $e_2$ where the output of phase/amplitude adjustment block is $s_1e_1$ and $s_2e_2$. As described earlier, different implementation or description can be used. For example, operation may be explained by multiplication of diagonal matrix where scalar (complex or real) coefficients $e_1$ and $e_2$ are the diagonal elements, i.e., $$\begin{bmatrix} e_1 & 0 \\ 0 & e_2 \end{bmatrix}.$$

Functionalities described can be performed for both single and multi-branch NoMA transmissions. In multi-branch transmission, the gain $G_i$ may be configured to facilitate for multi-branch separation. Such gain adjustment may associate with MA signature. Bit-level and/or symbol-level processing described may be performed branch specific manner or common to all branches whether such operations are associated with a MA signature or not.

Configuration 5—NoMA Transmitter that Produces Signal from Non-Overlapping, Full-Overlapping or Partial-Overlapping Sub-Set of Input Bits in Multi-Branch Transmission.

In multi-branch transmission-based NoMA signal generation, a modulator can be configured to accept full overlapping or partial overlapping or non-overlapping sub-set of input bits of c. In general, one or more modulators may operate on combinations of sub-sets as well. For example, one branch may input disjoint bits from all other branches while another branch may input full-overlapping sub-sets (the same bit stream is repeated). Moreover, the modulators in each branch may be different, for example, one branch is a BPSK modulator while the other branch is a QPSK modulator.

The amplitude/phase adjustment may be performed before or after the summation block. The branch gain $G_i$ facilitates successive cancellation at the receiver and therefore, the receiver is capable of decoding each branch whether branch signal is associated with a MA signature or not. A branch may associate with MA signature by bit-level processing or symbol-level processing or combination thereof that may include interleaving, scrambling, linear spreading, sparse mapping etc. In some embodiments, branches may associate different processing functions and modulators. For example, one branch performs bit-interleaving while the other branch does not perform interleaving. Another example is one branch perform operations required for linear spreading (Configuration 1) while the other branch does not perform operations required for linear spreading.

The multiple branches can be configured to perform similar operations. For example, one branch performs operations for linear spreading that produces a spreading sequence and another branch performs operations for linear spreading that produces a spreading sequence different from the other one. Such spreading sequences across branches can be orthogonal. In yet another example, one branch performs operations for a specific sparse mapping and another branch performs operation for sparse mapping that maps to non-overlapping REs from the other one. As a result, in the multi-branch transmission, no two symbols are mapped to the same RE.

Figure 11:
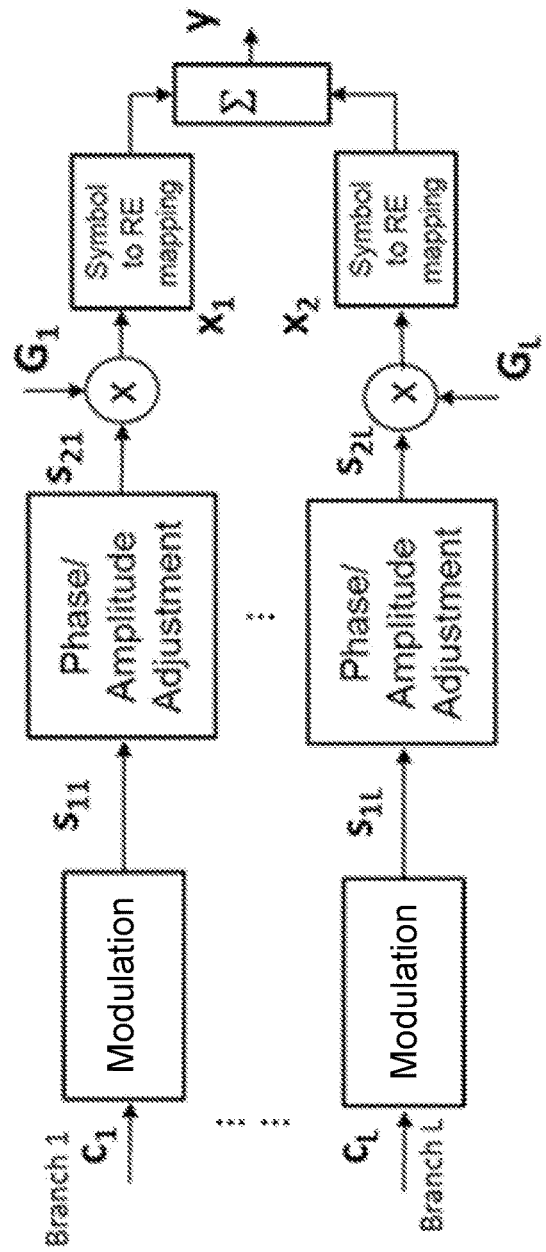
FIG. 11 and FIG. 12 are specific examples of multi-branch configurations.

As shown in FIG. 11, consider the scenario of $x_1=[x_{11}\ x_{12}]^T$ and $x_2=[x_{21}\ x_{22}]^T$ and sparse mapping by sparse patterns [1 1 0 0] and [0 0 1 1] in branch 1 and 2 respectively. The output (without the gain $G_i$) is $y=[x_{11}\ x_{12}\ x_{21}\ x_{22}]$. In another configuration, $x_1=[x_{11}]$ and $x_2=[x_{21}]$ sparse mapping by sparse patterns [1 0 0 0] and [0 0 1 0] in branch 1 and 2, respectively. The output (without the gain $G_i$) is $y=[x_{11}\ 0\ x_{21}\ 0]$. In another configuration, $x_1=[x_{11}]$ and $x_2=[x_{21}]$ sparse mapping by sparse patterns [1 0] and [0 1] in branch 1 and 2, respectively. The output (without the gain $G_i$) is $y=[x_{11}\ x_{21}]$ which is non-sparse. All these sparse patterns are non-overlapping. In another example, $x_1=[x_{11}\ x_{12}]^T$ and $x_2=[x_{21}\ x_{22}]^T$ sparse mapping by sparse patterns [1 1 0 0] and [0 1 1 0] in branch 1 and 2 respectively. The output (without the gain $G_i$) is $y=[x_{11}, (x_{12}+x_{21}), x_{22}, 0]$. In this case, the sparse patterns are overlapping at the second RE.

As shown in FIG. 11, consider the scenario of $s_{11}=[s_{11}\ s_{12}]^T$ and $s_{12}=[s_{21}\ s_{22}]^T$ and phase/amplitude adjustments [1 1] and [1 −1] in branch 1 and 2 respectively and symbol to RE mapping is non-sparse. The output (without the gain $G_i$) is $y=[s_{11}+s_{12}, s_{21}−s_{22}]$. Note that the linear spreading sequences are orthogonal. Non-orthogonal spreading sequences such as [1 1], [1 j] can also be implemented similarly.

Symbol to RE mapping block can be before the gains or after the sum block.

Non-Overlapping Sub-Set:

In a multi-branch transmission, bit level processing such as interleaving, scrambling may be performed in a branch/layer specific way. This will allow for decoding each branch separately. As such similar to Configuration 4, a modulator may accept disjoint/non-overlapping sub-sets of input bits that will produce a corresponding set of symbols. In general, multiple modulators with of different modulation orders are possible. When the branch separation, i.e., decoding of each branch is feasible, even in the absence of branch specific operation such as interleaving or scrambling or both, multi-branch transmission with non-overlapping sub-set input to modulator may be implemented. For example, when the source bits are sufficiently uncorrelated and with the randomization of FEC (internal FEC interleaver and FEC structure) branch separation at the receiver side may be feasible. In some embodiments, the receiver is capable to mitigating interference by the branch gain difference (i.e., intentional power offset in the branches).

Overlapping Sub-Sets:

In a multi-branch transmission where each modulator is input the overlapping sub-set of bits SF times repeatedly to produce the same symbol SF times. The amplitude/phase adjustment in each branch can be configured branch specific. This procedure allows us to produce branch specific linear spreading in each branch. The receiver is able utilize this branch specific linear spreading to mitigate the inter-branch interference. Another approach is the use of gain $G_i$ that allow successive interference cancellation to be more efficient so that all branches are decoded. A combination of such approaches, i.e., branch gain together with branch specific linear spreading can be used. Each branch may use distinct modulators, i.e, one branch is using BPSK modulator while the other branch using QPSK modulator. When multiple branches use the same modulator, parallel implementation may be useful for cost effective large scale manufacturing.

Partial Overlapping Sub-Sets:

In a multi-branch transmission where each branch using a modulator and take input of overlapping sub-sets of input bit stream c. Similar to Configurations 2 and 3, the input bit stream is split into multiple sub-sets that has common bits (i.e., overlapping bits).

Configuration 6—Non-Linear Spreading

Figure 12:
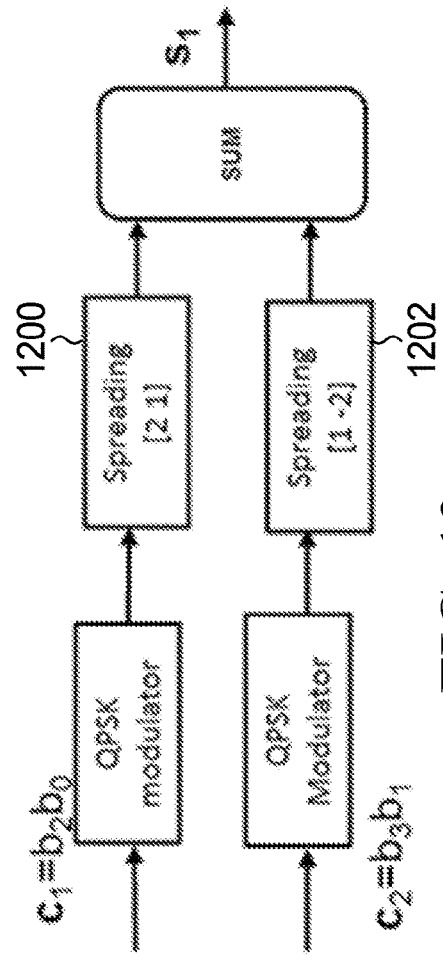

In another configuration to produce $s_1$ from c is described in the FIG. 12. At first, every 4 bits of stream c is split into two streams $c_{11}=[b_2\ b_0]$ and $c_{12}=[b_3\ b_1]$. This can be achieved by demux as shown in the multi-branch NoMA transmission. In this case, FEC or bit level processing or both may have performed prior to the demux operation. Two streams $c_1$ and $c_2$ are input to the QPSK modulators. In practice, the same modulator can be used repeatedly to produce QPSK symbols of $c_1$ and $c_2$. Each output of QAM modulator is spread at 1200,1202 using the sequences [2 1] and [1 −2] and two outputs of length 2 symbols are summed. For example, spreading 1200,1202 using the sequences [2 1] and [1 −2] can be realized by using appropriately configured phase and amplitude adjusters as in previous embodiments.

Figure 13:
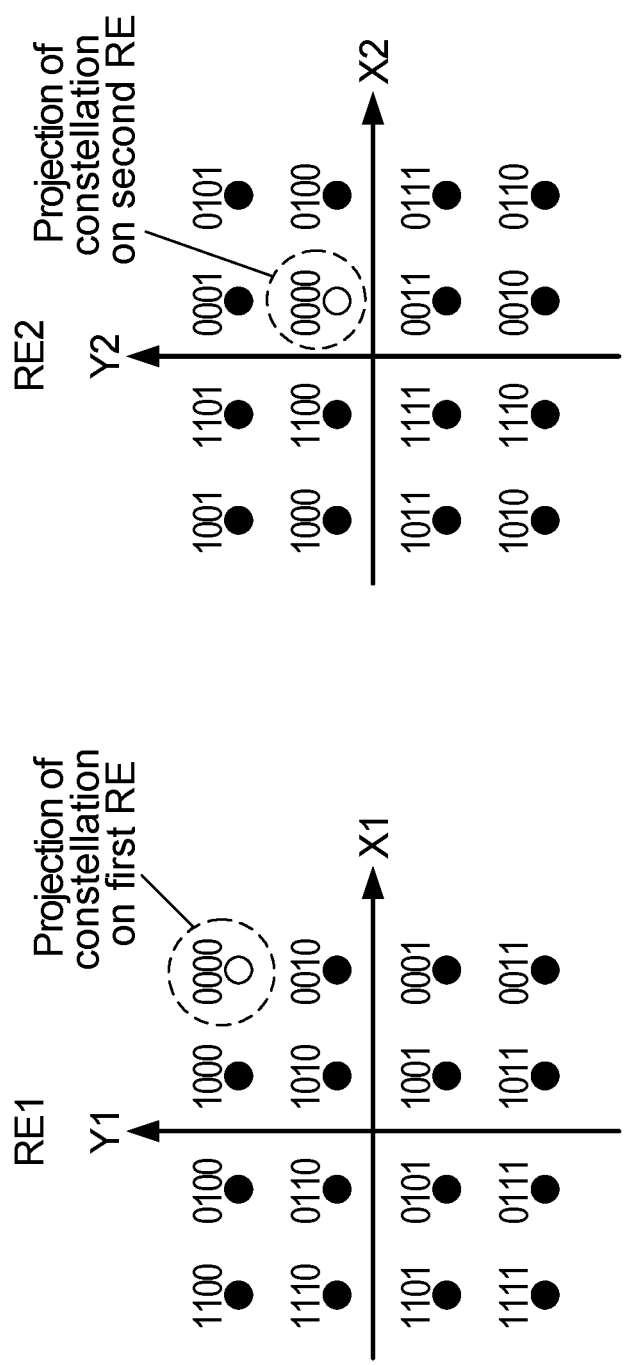
FIG. 13 shows an example of using two modulators to generate a 16-point SCMA codebook with 16-projection points.

This approach produces two symbol output with 16 constellation points and bit to symbol mapping is 16-point SCMA codebook with 16-projection points. An Example is shown in FIG. 13.

Figure 14:
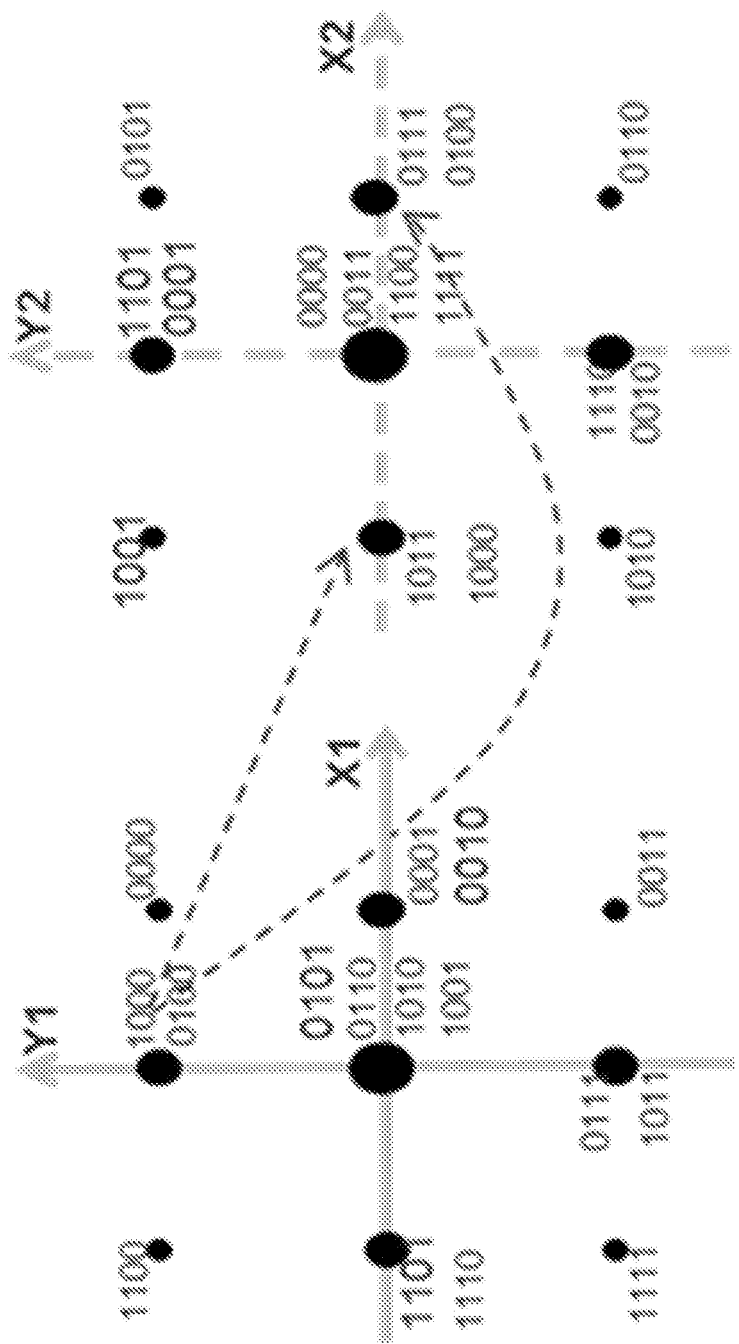
FIG. 14 shows an example of using two modulators to generate a 16-point SCMA codebook with 9-projection points

Alternatively, spreading sequences can be made [1 1], [1 −1] in which case the this approach produces 9 constellation points and bit to symbol mapping of 16-point SCMA codebook with 9-projection points as shown in FIG. 14. Note that in this case, multiple bit sequences are mapped to a single constellation point. For example, 0 symbol (x1, y1) coordinates (0,0) representing 0101, 0110, 1010, 1001 bit sequences.

The operation can be followed by phase/amplitude adjustment block. The use of this block allows to expand the signature space which is critical for high loading systems such as mMTC/eMBB scenarios.

Figure 15:
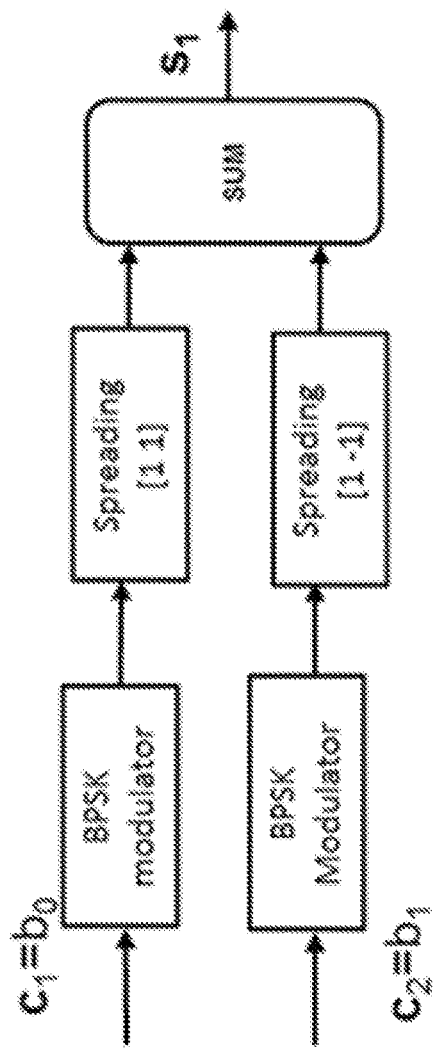
FIG. 15 is another example of a multi-branch configuration.

Another approach to produce $s_1$ from c is described with reference to FIG. 15. At first, every 2 bits of stream c is split into two streams $c_{11}=[b_0]$ and $c_{12}=[b_1]$. This can be achieved by demux as shown in the multi-branch NoMA transmission. Similarly, in this case, FEC or bit level processing or both may have performed prior to the demux operation. Two streams $c_1$ and $c_2$ are input to the BPSK or π/2-BPSK modulators. In practice, the same modulator can be used repeatedly to produce the symbols of $c_1$ and $c_2$. Each output of modulator is spread using the sequences [1 1] and [1 −1] and sum the two outputs of length 2 symbols.

Figure 16:
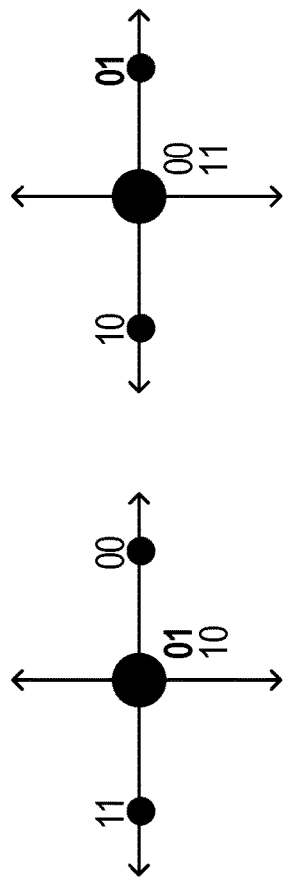
FIG. 16 is an example of a 4→3 point low-projection codebook.

The output of this configuration produces a SCMA 4-point codebook with constellation such as depicted in FIG. 16.

Configuration 7—SCMA Codebook, Linear Spreading with Sparsity (Sparse Spreading) and Independent Symbol Sparse Mapping NoMA Transmitter.

As described in Configurations 1-6, the output of the phase/amplitude adjustment block is a stream of symbols of length $M_2$. This M symbols correspond to a single bit stream c or b of length m. Streams of symbols corresponds to multiple bit streams of c or b, are mapped to physical resources of time-frequency resource grid (REs). The mapping of a stream of $M_2$ symbols to N REs can be one-to-one in which case $M_2=N$. In another case where sparsity is desired for eNB receiver to operate at lower complexity or faster/low-delay decoding or better multi-user interference management, symbol to RE mapping block can introduce such sparsity.

Note that sparse density can be defined as the ratio of $\rho=M_2/N$. For example, sparse density 0.5 means half of the physical resources mapped zero symbol/sparse/empty. The sparse pattern (which REs are empty and which REs non-empty) is configurable.

Sparse patterns can be applied to the single stream of symbols produced by the single branch NoMA or multi-branch NoMA. In multi-branch NoMA transmission, sparsity or amplitude/phase adjustment or both can also be performed prior to summation block ($\Sigma$).

Alternatively, as described in Configuration 1, sparsity can also be implemented by the phase/amplitude adjustment block. In yet another approach, sparsity can be viewed as puncturing or pruning the symbol stream to produce the desired sparse pattern.

Configuration 8—specific examples of SCMA signal, linear spreading, linear spreading with sparsity (sparse spreading) and independent symbol sparse mapping NoMA transmitter.

As described in previous configurations, the output of the modulator is symbol stream of length $M_1$ with desired properties such as full overlapping sub-sets, partial overlapping sub-sets or non-overlapping subsets of the input bit stream c. As detailed, the output symbol streams may or may not be associated with an MA signature.

By the phase/amplitude adjustment block or the symbol-to-RE mapping block or both, a SCMA codebook can be generated with or without additional features. For example, output symbol stream with partial overlapping may produce SCMA codebook described in Configuration 3. The output can be sparse mapped to time-frequency grid by either phase/amplitude adjustment block or the symbol-to-RE mapping block as described in other configurations. Such a stream of symbols may or may not have additional features such as branch specific interleaver. The overall symbol stream may or may not associate with an MA signature.

In another embodiment, with non-overlapping sub-sets of input bits with the phase/amplitude adjustment block or the symbol-to-RE mapping block or both, sparse mapping of independent stream of symbol can be achieved. This can be used to achieve interleave-grid multiple access (IGMA).

In another embodiment, with full-overlapping sub-sets of input bits with the phase/amplitude adjustment block or the symbol-to-RE mapping block (non-sparse mapping) linear spreading can be achieved. This can be used to achieve multi-user shared access (MUSA).

In another embodiment, with full-overlapping sub-sets of input bits with the phase/amplitude adjustment block or the symbol-to-RE mapping block or both (sparse mapping) linear spreading sequence of symbols can be sparsely mapped to physical resources. This can be used to achieve pattern division multiple access (PDMA).

In order to configure the provided NoMA transmitter to function appropriately and to benefit from the proposed NoMA signal generation method, methods for configuring and exchanging parameters between BS and UE are provided. These parameters configure or specify the values of the NoMA configuration inputs and other NoMA parameters such as m, M, N, phase and amplitude modifier, symbol to RE mapping, modulation order, number of branches/stream, transport block size (TBS), code rate (FEC). Some of these parameters may be explicitly informed to the UEs by the BS for use in configuring the UE for uplink transmission. In a downlink transmission scenario, the BS may set these values in the NoMA transmission and inform the UE explicitly.

In some embodiments, some configuration parameters (including but not limited to modulation order ($2^m$), number of branches (L), modulation mapping block length (M) and symbol-to-RE mapping block length (N)) may directly link to the TBS and/or transmission spectral efficiency (SE) and therefore, it may implicitly be indicated to the UE through a mapping function/table. This mapping function/table can also be regarded as NoMA modulation and coding scheme (MCS) table. An example of this mapping function/table can be given as follows:

TABLE 3

NoMA MCS table

| Index # | SE and/or TBS value | m | L | M | N | FEC rate |
|---|---|---|---|---|---|---|
| 1 | SE < 0.1, TBS < 10 bytes | 1 | 2 | 4 | 4 | Calculated based on SE |
| 2 | 0.1 < SE < 0.2, 10 < TBS < 20 bytes | 2 | 1 | 4 | 4 | Calculated based on SE |
| 3 | 0.2 < SE < 0.4, 20 < TBS < 40 bytes | 2 | 4 | 2 | 4 | Calculated based on SE |
| 4 | 0.2 < SE < 0.4, 20 < TBS < 40 bytes | 2 | 2 | 2 | 4 | Calculated based on SE |
| 5 | 0.4 < SE < 0.6, 40 < TBS < 60 bytes | 2 | 2 | 2 | 4 | Calculated based on SE |
| 6 | 0.4 < SE < 0.6, 40 < TBS < 60 bytes | 2 | 2 | 2 | 6 | Calculated based on SE |
| 7 | 0.6 < SE < 0.8, 60 < TBS < 80 bytes | 2 | 2 | 2 | 4 | Calculated based on SE |
| 8 | 0.6 < SE < 0.8, 60 < TBS < 80 bytes | 4 | 1 | 6 | 6 | Calculated based on SE |
| ... | ... | | | | | |

Note that this is just an example of the NoMA MCS table. The detailed design of each configuration (in terms of the modulator block, phase/amplitude adjustment, symbol-to-RE mapping and multi-branch implementation option (e.g. which one of the 4 options indicated in FIGS. 6 to 9 and relation of the parameters of each branch to other branch(s)) can be figured out through simulation and/or other theoretical/experimental mechanisms. In practice, more detailed MCS tables can be designed based on particular values of SE/TBS (similar to LTE) and the corresponding NoMA configurations for each setup can be obtained by simulation and/or other theoretical/experimental mechanisms. Furthermore, for each value of TBS/SE there might be multiple NoMA configurations given in the table depending on traffic load and receiver capability. This is to provide the best trade-off between the coding gain, UE separation and receiver complexity. For example, in some scenarios with light user overloading, it might be desired to use multiple branches and shorter mapping blocks (N) for each UE to maximize the coding gain. However, in high traffic load when multiplexing of large number of users is probable, configurations with better UE separation capability is desired, e.g. using single branch and larger mapping blocks (N). The same thing can be said for receiver capability; if the receiver capability is low (e.g. in terms of performing SIC operation and number of outer-loop iterations, multi-user detection complexity, etc.), configurations with better UE separation capability in symbol domain are desired e.g. using single branch and larger mapping blocks (N). In some embodiments, there might be multiple MCS tables corresponding to each of these parameters. The NoMA MCS table(s) can be configured by the network and communicated to the UE through RRC signalling, MAC-CE and the like. In some embodiments, the NoMA MCS table(s) can be pre-stored in a UE before purchase. In this case, any update in the MCS table(s) can be signalled to the UE by network, for example by a gNB.

In some embodiments, the NoMA MCS index is explicitly signalled by the gNB to the UEs through RRC signalling, dynamic signalling (e.g. D1 signalling) and the like. In the case that there are multiple MCS tables corresponding to the decisive parameter including but not limited to traffic loading and receiver capability, there might be some additional signalling of which MCS table to use. This additional signalling may have a different periodicity and/or communication channel and can be done through RRC signalling, MAC-CE or dynamic signalling.

In some other embodiments, the NoMA MCS index is selected by the UE based on the required TBS and some long-term measurements from the network including SINR measurement, RSRP measurements or the like and/or CSI feedback by gNB (CSI feedback can be used for multi-purpose such as channel measurements and obtaining/deriving MCS table etc). The NoMA MCS index selection can also take into account some adaptation parameters like traffic loading and receiver capability which is communicated by gNB as explained above. In the case NoMA MCS index is selected by the UE, it can be blindly detected by gNB. In some embodiments, this index can be mapped to some other parameters (like DMRS sequence index) to facilitate the detection at the gNB.

In some other embodiments, the physical layer TBS is set to a fixed number (e.g. through segmentation in the higher layer). In this case, the NoMA MCS index is only dependent on the adaptation parameters like but not limited to traffic loading and receiver capability which can be communicated by gNB through mechanism explained above. In this case, no blind detection is required at the gNB.

Some communication between BS and UEs may be implicit in the sense that the UE derives or obtains the value from some other information available. For example, the BS may inform the UE of the physical resource allocation for a transmission, and inform the UE of the TBS of the transmission. If the transmission is configured to be an SCMA codebook, such as in configuration 6, the UE, based on the received TBS, may implicitly determine the modulation order and FEC rate. In the same example, UE may decide to use single or multi-branch NoMA signal generation. Whether UE uses single or multi-branch may be signaled to the BS to reduce the decoding/receiver complexity.

In some scenarios, relationship between parameters or rules may be defined. For example, in order to reduce the complexity of the system or based on a performance merit, for low number of TBS sizes, NoMA transmission may not use sparsity, i.e., symbol-to-RE mapping block may be configured to non-sparse mapping for low TBS values. Such non-sparse mapping can be defined as a default value, i.e., if the configuration value is not specified or informed, a default value of non-sparse is configured. The amplitude/phase adjustment is set to no-adjustment, i.e., output of the modulator is directly passed to the symbol-to-RE mapping block ($s_1=s_2$). Such a configuration for amplitude/phase adjustment block can be a default value.

BS may inform UE to perform certain measurements and optionally inform/report to BS. Such measurement may include, interference level for the MA signature pool or a portion of a MA signature codebook (several indices). Examples of such measurements may include signal-to-interference ratio (SIR), signal-to-interference-plus-noise ratio (SINR), interference-to-noise ratio (INR), the MA signature with highest SINR, SIR, INR etc, the MA signature with worst SINR, SIR, INR etc. UE may report the '$n_1(\geq 1)$' number of MA signatures that gives the highest SINR/SIR/INR or the '$n_2(\geq 1)$' number of MA signatures that gives the lowest SINR/SIR/INR. These measurements or such MA signatures may be reported to the BS. BS may instruct the UEs to use such limited MA signature pool based on the performed measurements and optionally inform the BS.

BS may inform the NoMA parameters or sub-set of these parameters more dynamically such as DCI signaling. In some cases, BS may inform the NoMA parameters or sub-set of these parameters to UEs by RRC or MAC-CE signaling.

In some cases, BS may explicitly specify the NoMA parameter values and configurations to the UE. In some cases, BS may override the choice of UE (MA signature or values).

In some transmission scenarios such as transmission without a dynamic grant or grant-free transmissions, UE may choose a configuration based on its measurements or at random. BS may blindly attempt find the configuration used by the UE. The BS and UE may agree on a constraint MA signature pool or set of pools. Based on the measurements or pre-defined rule or explicit information from BS, UE may choose to use a specific MA signature or restrict the MA signature pool to a certain smaller size pool. Such constraints, rules or signaling help to reduce the receiver complexity and the blind detection.

In some scenarios and embodiments, the measurements, signaling, MA signature pool rules/relationships may be wave form dependent. For example, BS may configure or UE selects/chooses CP-OFDM waveform which is suitable for medium to high spectral efficiency and/or PAPR insensitive scenarios, and therefore, certain parameter configurations or values may be used while others are not used. In another scenario where low spectral efficiency and/or PAPR sensitive scenarios where BS configure or UE selects DFT-s-OFDM waveform for transmission, certain parameter configurations or values may be used while others are not used. For example, certain sparse patterns or linear spreading sequences may be used as they give low PAPR properties.

In some cases, based on the measurements or otherwise, UEs may restrict the certain parameters or values. For example, below a certain SINR threshold, UE is considered cell edge and limit the choices in the MA signature pool or configurations or parameters values. In such a scenario, the UE may need to perform additional measurements such as SINR and report to BS as additional interference is caused by the neighbor cells.

Figure 17:
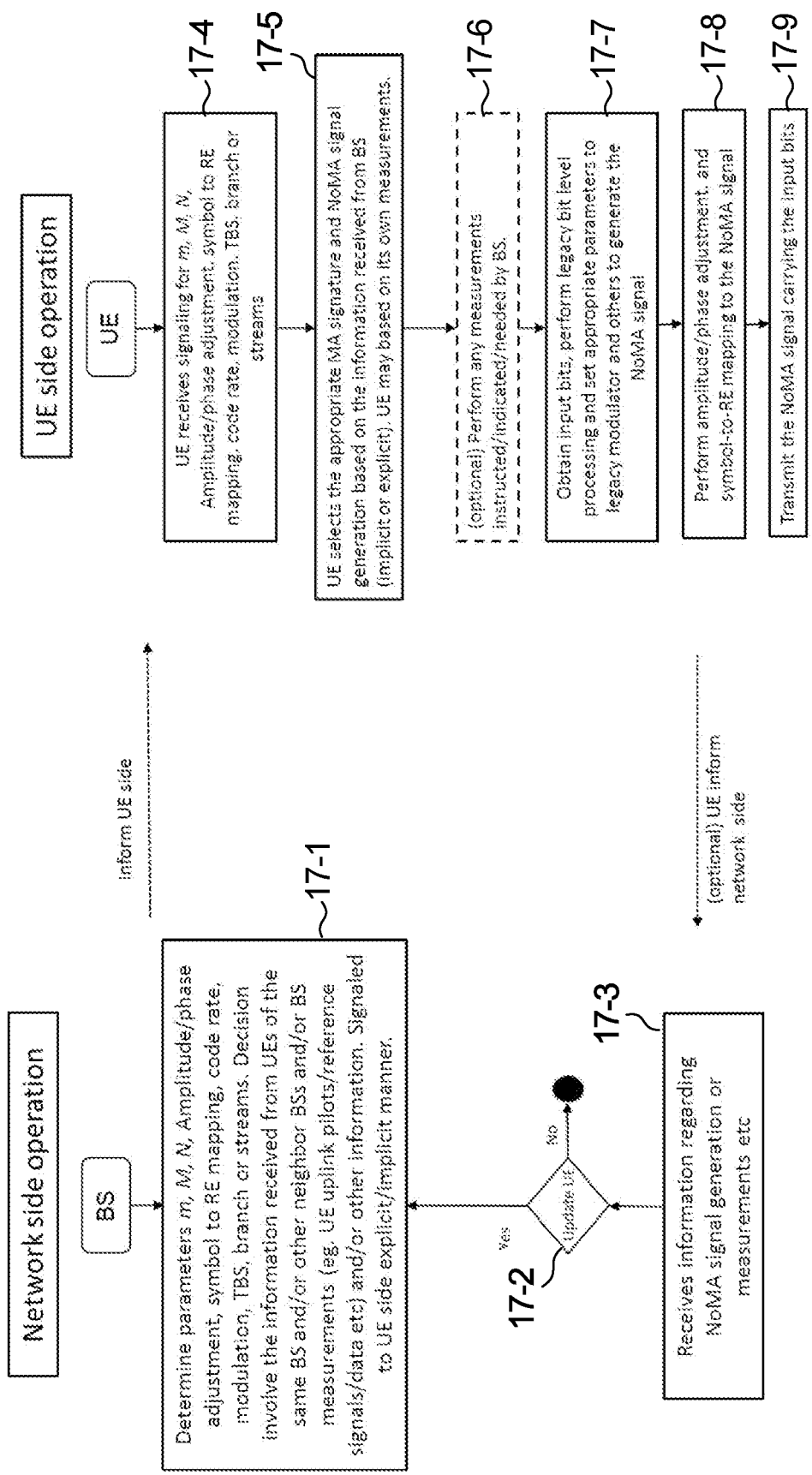
FIG. 17 is a flowchart of an example method of NoMA scheme configuration.

FIG. 17 shows an example flow of information between BS and UE. In block 17-1, the BS determines parameters m, $M_1$, $M_2$, N, Amplitude/phase adjustment, symbol to RE mapping, code rate, modulation, TBS branch or streams, etc. Decision involves the information received from the UEs of the same BS and/or other neighbor BSs and/or BS measurements (e.g. UE uplink pilots/reference signals/data etc) and/or other information. This may be signaled to UE side explicit/implicit manner. In block 17-2, the BS determines if it is time to update the UE, and if so, block 17-1 is performed. In block 17-3, the BS receives information regarding NoMA signal generation or measurements etc. Block 17-2 is performed on the basis of this information.

In block 17-4, the UE receives signaling for m, N, Amplitude/phase adjustment, symbol to RE mapping, code rate, modulation, branch or streams. In block 17-5, the UE selects the appropriate MA signature and NoMA signal generation based on the information received from BS (implicit or explicit). This may be also based on the UE's own measurements. In block 17-6, (optional) the UE performs any measurements instructed/indicated/needed by BS. In block 17-7, the UE obtain input bits, perform bit level processing and set appropriate parameters to the modulator and others to generate the NoMA signal. In block 17-8, the UE performs amplitude/phase adjustments, and symbol-to-RE mapping to the NoMA signal. In block 17-9, the UE transmits the NoMA signal carrying the input bits.

Table 4 shows an example set of parameter values/configurations for NoMA transmission for use with the described transmitters.

TABLE 4

NoMA parameters and configurations

| Index # | m | L | M | N | Modulator | Phase/Amplitude adjustment | Symbol to RE mapping |
|---|---|---|---|---|---|---|---|
| 1 | 1 | 1 | 1 | 1 | BPSK/π/2-BPSK | No | Non-sparse |
| 2 | 1 | 2 | 2 | 4 | BPSK/π/2-BPSK | Yes | Sparse |
| 3 | 2 | 1 | 1 | 1 | QPSK | No | Non-sparse |
| 4 | 2 | 1 | 2 | 2 | QPSK | Yes/No | Non-sparse |
| 5 | 2 | 1 | 3 | 3 | QPSK | Yes/No | Non-sparse |
| 6 | 2 | 1 | 4 | 4 | QPSK | Yes/No | Non-sparse |
| 7 | 2 | 1 | 6 | 6 | QPSK | Yes/No | Non-sparse |
| 8 | 2 | 1 | 1 | 4 | QPSK | No | Sparse |
| 9 | 3 | 1 | 2 | 4 | QPSK | Yes/No | Sparse |
| 10 | 4 | 1 | 1 | 1 | 16-QAM | No | Non-sparse |
| 11 | 4 | 1 | 4 | 4 | 16-QAM | Yes/No | Non-sparse |
| 12 | 4 | 1 | 6 | 6 | 16-QAM | Yes/No | Non-sparse |
| 13 | 4 | 1 | 2 | 4 | QPSK | No | Sparse |
| 14 | 4 | 2 | 2 | 4 | QPSK | Yes/No | Sparse |
| 15 | 4 | 2 | 4 | 4 | QPSK | Yes/No | Non-Sparse |
| 16 | 4 | 2 | 2 | 6 | QPSK | Yes/No | Sparse |
| 17 | 6 | 1 | 3 | 4 | QPSK | No | Sparse |
| 18 | 6 | 1 | 3 | 6 | QPSK | No | Sparse |
| 19 | 6 | 1 | 2 | 4 | 16-QAM | Yes/No | Sparse |
| 20 | 6 | 1 | 2 | 6 | 16-QAM | Yes/No | Sparse |
| 21 | 8 | 1 | 4 | 6 | QAM | No | Sparse |
| 22 | 8 | 4 | 2 | 4 | QAM | Yes/No | Sparse |
| 23 | 8 | 4 | 2 | 6 | QAM | Yes/No | Sparse |
| 24 | 10 | 1 | 5 | 6 | QAM | No | Sparse |
| 25 | 12 | 6 | 2 | 6 | QAM | Yes/No | Sparse |
| ... | ... | ... | ... | ... | ... | ... | ... |

In the above, index 1 can be a configuration for non-sparse symbol-to-RE mapping of independently modulated BPSK or π/2-BPSK symbols.

In the above, index 2 can be a configuration for sparse non-linear spreading (SCMA 4-point codebook with sparse symbol to RE mapping of length (i.e., 4 REs)).

In the above, index 3 can be a configuration for non-sparse symbol-to-RE mapping of independently modulated QPSK symbols.

In the above, indices 4, 5, 6, 7 can be a configuration for non-sparse linear spreading of QPSK modulated symbols with spreading length 2, 3, 4, 6, respectively.

In the above, index 8 can be a configuration for sparse symbol to RE mapping of QPSK modulated symbols to 4 REs.

In the above, index 9 can be a configuration for sparse non-linear spreading (SCMA 8-point codebook with sparse symbol to RE mapping of length (i.e., 4 REs).

In the above, index 10 can be a configuration for non-sparse symbol-to-RE mapping of independently modulated 16-QAM symbols.

In the above, indices 11 and 12 can be a configuration for non-sparse linear spreading of 16-QAM modulated symbols with spreading length 4 and 6, respectively.

In the above, index 13 can be a configuration for sparse symbol to RE mapping of two QPSK modulated symbols to 4 REs.

In the above, index 14 can be a configuration for two branch implementation of sparse non-linear spreading (SCMA 16-point codebook) with sparse symbol to RE mapping of length 4 (i.e., 4 REs).

In the above, index 15 can be a configuration for two branch non-sparse linear spreading.

In the above, index 16 can be a configuration for two branch implementation of sparse non-linear spreading (SCMA 16-point codebook) with sparse symbol to RE mapping of length 6 (i.e., 6 REs).

In the above, indices 17 and 18 can be a configuration for sparse symbol to RE mapping of three QPSK modulated symbols to 4 and 6 REs, respectively.

In the above, indices 19 and 20 can be a configuration for single branch implementation of sparse non-linear spreading (SCMA 64-point codebook) with sparse symbol to RE mapping of length 4 and 6 (i.e., 4 and 6 REs), respectively.

In the above, index 21 can be a configuration for sparse symbol to RE mapping of four QPSK modulated symbols to 6 REs.

In the above, indices 22 and 23 is a configuration for four branch implementation of sparse non-linear spreading (two layers of SCMA 16-point codebook) with sparse symbol to RE mapping of length 4 and 6 (i.e., 4 and 6 REs), respectively.

In the above, index 24 can be a configuration for sparse symbol to RE mapping of five QPSK modulated symbols to 6 REs.

In the above, index 25 can be a configuration for six branch implementation of sparse non-linear spreading (three layers of SCMA 16-point codebook) with sparse symbol to RE mapping of length 6 (i.e., 6 REs).

As described in above, phase/amplitude adjustment can be used to produce linear spreading sequences or sparse mapping or symbol scrambling or combinations thereof. Similarly, symbol to RE mapping may be sparse or non-sparse. Amplitude/phase adjustment and symbol to RE mapping can be specified in a table. Default values of such operation may be specified. For example, by default no adjustment of phase/amplitude can be specified. Non-sparse symbol to RE mapping can be considered a default value.

In some embodiments, multi-branch transmission is used. A rule or relationship among branch values or configurations may be specified. For example, generation of SCMA 16-point codebook depend on two branches with specific phase/amplitude adjustment (See Configuration 6). In another example where linear spreading with multi-branch, orthogonal spreading sequences among branches gives better BLER performance and therefore can be specified.

BS may inform UE to use a specific index of the Table 4. Other parameters such as FEC code rate can be calculated based on the allocated physical resources and TBS. Based on information received from BS or performed measurements or other configuration (such waveform, cell-edge UE etc), certain index/indices may be used while others are not used.

In some cases, the UE may derive the NoMA parameters from other information received from the base station, such as: information indicating an MCS level; TBS; spreading factor or related parameter; sparsity level/factor (which may be defined as the ratio of non-zero resources utilized for data transmission for a given device over the total available resources), or related parameter; Hybrid Automatic-Repeat-Request (HARQ) and associated parameters; grant-free or grant-based transmission and associated parameters; a number of UEs being served by the base station or related parameters such as the traffic load, which refers to the average number of users/streams simultaneously served by the base station (which is also referred to overloading factor).

A UE may also select NoMA parameters based on a UE specific identifier, e.g., a radio node temporary identifier (RNTI). A UE may also select NoMA parameters based on an index associated with a demodulation reference signal (DM-RS) pattern. A UE may also randomly select NoMA parameters, e.g., a. NoMA signal is selected randomly based on information carrying bits, and the base station detects the NoMA signal based on an MA signature. Alternatively, a UE may select NoMA parameters based on its own measurements. For example, the UE may select NoMA parameters that provide the highest SINR, and avoid NoMA parameters that provide the lowest SINR. Alternatively, the NoMA parameters may be a priori information to the UE. As yet another alternative, the NoMA parameters may be selected according to a combination of the above-mentioned signaling/selection techniques, e.g., an amplitude/phase adjuster index may be explicitly signaled and a symbol to RE mapping may be derived from an MCS level. In another example, index/indices of amplitude/phase adjuster may be associated or related with an index/indices of symbol to RE mapping.

Returning to FIG. 2B, as detailed above, a UE-specific configuration and/or layer/branch/stream-specific configuration may be input to one or more of the bit-level processor 202, the modulation block 204 (input not shown), the phase/amplitude adjuster 206, and the symbol-to-RE mapper 208. This configuration, and potentially other parameters, is referred to herein as an "MA signature." The MA signature may also be known as a "NoMA signature" or simply "signature" for simplicity.

In an example embodiment that focuses on legacy modulators, the MA signature may be identified by different combinations of bit-level operations (including different bit-level scrambling and/or interleaving functions), different phase/amplitude adjustment matrices, and different symbol to RE mapping functions, defined by one or more of the control signals $i_1$, $i_2$, $i_3$, respectively. Configuring one or more of these parameters with the control signal(s) serves to apply the MA signature to input data for generating the multiple access signal, which can then be transmitted in the multiple access communication system, and decoded by a receiver in the multiple access communication system.

Figure 5:
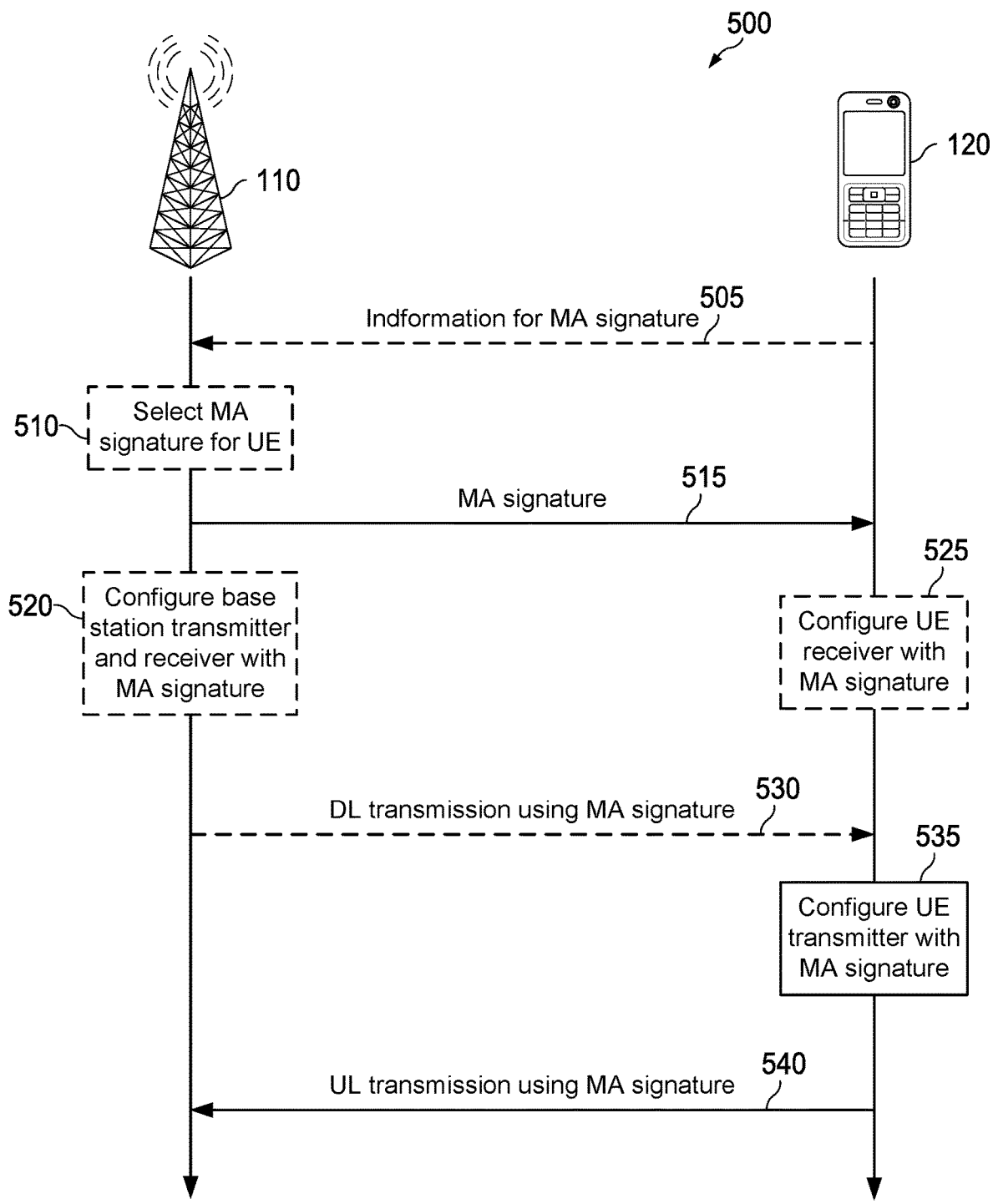
FIG. 5 is a flowchart diagram of an example method for signaling and using an MA signature in the wireless communications network.

FIG. 5 is a flowchart diagram showing an example method 500 for signaling the MA signature, and optionally using the MA signature, in a multiple access communication system. The method optionally comprises, at 505, a UE sending to a base station 110 an information for an MA signature, and at 510, the base station selecting the MA signature for the UE. The information for the MA signature may include any information for facilitating selection of the MA signature by the base station, including peak to average power ratio (PAPR) requirements, application type, transmission type/mode, transport block size (TBS), spectral efficiency (SE), modulation and coding scheme (MCS), receiver capability, transmitter capability, and key performance indicator (KPI). The UE may indicate or report the information to the network explicitly or implicitly, for example, by making the selection linked to a UE identifier using a pre-configured mapping. Other explicit or implicit signaling possibilities also exist for communicating the information from the UE to the network, or vice versa.

The method 500 comprises, at 515, the base station transmitting the MA signature to the UE. Alternatively, the base station may transmit the MA signature independently, without receiving a specific request. Further, the MA signature may be predefined for the UE and the base station may not need to select the MA signature. The MA signature may be transmitted using a layer 1 (L1)/physical layer signal or it may be transmitted using a higher-layer signal, such as Radio Resource Control (RRC) signaling. For example, the RRC signaling may indicate a chosen MA signature for the UE; alternatively or additionally, the RRC signalling may indicate a pool of MA signatures for the UE.

Transmitting the MA signature from the base station to the UE may comprise transmitting the MA signature itself or merely transmitting information that is indicative of the MA signature. For example, the base station may transmit information that the UE uses to derive its MA signature. For another example, the base station may transmit an index corresponding to a specific MA signature, which the UE uses in a lookup table to find the specific MA signature.

The method 500 further optionally comprises, at 520, the base station configuring its transmitter(s) and its receiver(s) with the MA signature in order to transmit and receive multiple access communications with the UE 120. Optionally, at 525, the UE similarly configures its receiver with the MA signature. For example, at 525, the UE configures its receiver using an MA signature received directly and explicitly from a base station. Alternatively, the UE configures its receiver using an obtained MA signature that is indirectly indicated by a base station. For example, the UE may receive a particular DM-RS pattern that is pre-associated with an MA signature and use the received DM-RS to obtain the MA signature for configuring its receiver. Optionally, at 530, the base station transmits, to the UE, a downlink transmission using the MA signature.

The base station may configure its transmitter(s) and receiver(s) based on indications received from other UEs being served by the base station, indications received from UEs being served by neighboring base stations, measurements taken by the base station (e.g., measurements derived from uplink pilots, reference signals, data, etc.), information received from other neighboring base stations (e.g., measurements, scheduling information, NoMA parameters assigned/used by neighboring base stations, etc.), and/or downlink information transmitted to the UEs. The NoMA parameters may include MA signatures, NoMA signal generation constraints (e.g., scrambling/spreading bit-level operations parameters), as well as NoMA related measurements that are to be taken and fed back to the base station. The NoMA parameters may be communicated via Radio Resource Control (RRC) signaling, downlink control information (DCI) messages, and/or media access control (MAC) control element (MAC-CE) signaling.

The method 500 comprises, at 535, the UE configuring its transmitter with the MA signature and, at 540, transmitting, to the base station, an uplink transmission using the MA signature. Configuring the transmitter and transmitting with the MA signature allows the UE's transmissions to reduce interfering with other UE's transmissions, and allows the base station to decode the UE's transmission using the MA signature. The UE may configure its transmitter using an MA signature received directly and explicitly from a base station. Alternatively, the UE configures its transmitter using an obtained MA signature that is indirectly indicated by a base station. For example, the UE may receive a particular DM-RS pattern that is pre-associated with an MA signature and use the received DM-RS to obtain the MA signature for configuring its transmitter.

It should be appreciated that the NoMA parameters may also be selected by the UE in other examples. For instance, a UE may select NoMA parameters based on indications from the network. In some examples, some NoMA parameters are selected by the UE, while other NoMA parameters are selected by the base station. In some other embodiments, a UE identifier (UE id) can be used for NoMA parameter selection by UE. It should be appreciated that the NoMA parameters selected by the base station and/or the UE may be used to transmit uplink and/or downlink NoMA signals. When the NoMA parameters are used for uplink transmissions, the base station may send a signal that specifies NoMA parameters selected by the base station and/or information to be used for selection of NoMA parameters by the UE, and the UE may use the indicated NoMA parameters to transmit uplink NoMA signals. When the NoMA parameters are used for downlink transmissions, the base station may send a signal that specifies NoMA parameters selected by the base station and/or information to be used for identification of NoMA parameters by the UE, and the UE may use said the indicated NoMA parameters for decoding of one or more downlink NoMA signals using multi-stream detection techniques.

In some embodiments, the UE may send NoMA-related feedback to the base station. The feedback information may indicate that the UE used a different NoMA parameter (e.g., a different index) than that which was signaled by the base station, such as when the UE selects the NoMA parameters based on its own measurements. The feedback information may also indicate measurement taken by the UE, such as an average, minimum, or maximum SINR for a selected set of NoMA reference signals. The measurements may be reported periodically. Alternatively, the measurements may be reported on-demand based on instructions received from the base station, according to a NoMA transmission (mode) initialization, when a NoMA transmission is configured, or when a UE performs an initialization/power-up procedure. The UE may explicitly signal the index of the MA signature used or the offset of the MA signature index received from base station side signaling. A base station can obtain information to derive NoMA signal being used from other information reported by UEs of the same base station and/or neighbor base stations or UEs of the neighboring base stations.

A UE may report to the base station an SINR in the absence of NoMA transmission, which may be used by the base station at network side for deriving the NoMA signal. The SINR report may indicate a best/worst/highest 'n' number or lowest 'm' number of SINR measurements corresponding to the NoMA signal, as well as an MCS level and desired NoMA signal parameters. Measurements/signaling from neighbor base station/UEs may be used for inter-cell and intra-cell interference mitigation. Cell-edge UEs of neighbor base stations may report the measurements (e.g., SINR) that can be used by the serving base station to avoid severe interference caused by its own cell-edge UEs to the cell-edge UEs of the neighboring cell.

Figure 18:
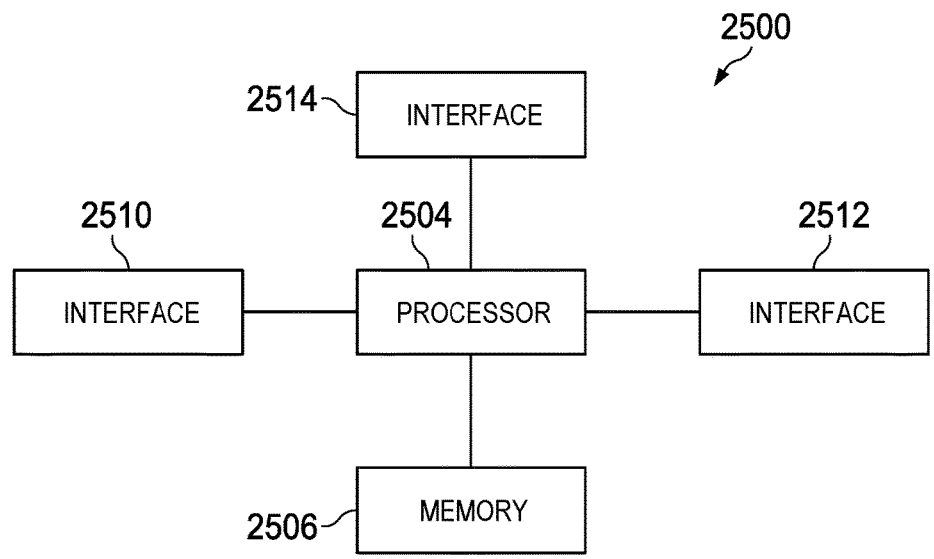
FIG. 18 is a block diagram of an embodiment processing system for performing methods described herein.

FIG. 18 illustrates a block diagram of an embodiment processing system 2500 for performing methods described herein, which may be installed in a host device. As shown, the processing system 2500 includes a processor 2504, a memory 2506, and interfaces 2510-2514. The processor 2504 may be any component or collection of components adapted to perform computations and/or other processing related tasks, and the memory 2506 may be any component or collection of components adapted to store programming and/or instructions for execution by the processor 2504. A means for configuring a transmitter and a receiver for a UE may include processor 2504. In an embodiment, the memory includes a non-transitory computer readable medium. The interfaces 2510, 2512, 2514 may be any component or collection of components that allow the processing system 2500 to communicate with other devices/components and/or a user. For example, one or more of the interfaces 2510, 2512, 2514 may be adapted to communicate data, control, or management messages from the processor 2504 to applications installed on the host device and/or a remote device. As another example, one or more of the interfaces 2510, 2512, 2514 may be adapted to allow a user or user device (e.g., personal computer (PC), etc.) to interact/communicate with the processing system 2500. The processing system 2500 may include additional components not depicted in FIG. 18, such as long term storage (e.g., non-volatile memory, etc.).

In some embodiments, the processing system 2500 is included in a network device that is accessing, or part otherwise of, a telecommunications network. In one example, the processing system 2500 is in a network-side device in a wireless or wireline telecommunications network, such as a base station, a relay station, a scheduler, a controller, a gateway, a router, an applications server, or any other device in the telecommunications network. In other embodiments, the processing system 2500 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 19:
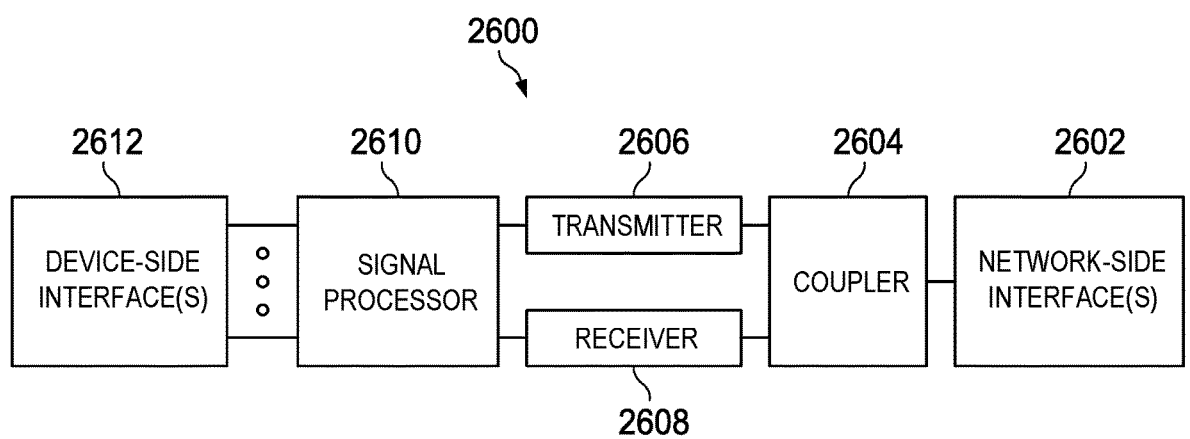
FIG. 19 is a block diagram of a transceiver adapted to transmit and receive signaling over a telecommunications network according to example embodiments described herein.

In some embodiments, one or more of the interfaces 2510, 2512, connects the processing system 2500 to a transceiver adapted to transmit and receive signaling over the telecommunications network. FIG. 19 illustrates a block diagram of a transceiver 2600 adapted to transmit and receive signaling over a telecommunications network. The transceiver 2600 may be installed in a host device. As shown, the transceiver 2600 comprises a network-side interface 2602, a coupler 2604, a transmitter 2606, a receiver 2608, a signal processor 2610, and a device-side interface 2612. The network-side interface 2602 may include any component or collection of components adapted to transmit or receive signaling over a wireless or wireline telecommunications network. The network-side interface 2602 may also include any component or collection of components adapted to transmit or receive signaling over a short-range interface. The network-side interface 2602 may also include any component or collection of components adapted to transmit or receive signaling over a Uu interface. The coupler 2604 may include any component or collection of components adapted to facilitate bi-directional communication over the network-side interface 2602. The transmitter 2606 may include any component or collection of components (e.g., up-converter, power amplifier, etc.) adapted to convert a baseband signal into a modulated carrier signal suitable for transmission over the network-side interface 2602. A means for transmitting an initial message of an access procedure may include transmitter 2606. The receiver 2608 may include any component or collection of components (e.g., down-converter, low noise amplifier, etc.) adapted to convert a carrier signal received over the network-side interface 2602 into a baseband signal. A means for receiving mobile subscriber identifiers, initial downlink messages of access procedures, and forwarded requests to connect to a network may include receiver 2608.

The signal processor 2610 may include any component or collection of components adapted to convert a baseband signal into a data signal suitable for communication over the device-side interface(s) 2612, or vice-versa. The device-side interface(s) 2612 may include any component or collection of components adapted to communicate data-signals between the signal processor and components within the host device (e.g., the processing system 2500, local area network (LAN) ports, etc.).

The transceiver 2600 may transmit and receive signaling over any type of communications medium. In some embodiments, the transceiver 2600 transmits and receives signaling over a wireless medium. For example, the transceiver 2600 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.).

In such embodiments, the network-side interface 2602 comprises one or more antenna/radiating elements. For example, the network-side interface may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 2600 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Although this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

The invention claimed is:

1. An apparatus, comprising:
   a bit level processor that performs interleaving, or scrambling, or interleaving and scrambling on an input bit sequence to produce an output bit sequence of a same length;
   a modulation block comprising at least one modulator, the modulation block producing a modulated symbol stream containing at least one symbol based on the output bit sequence;
   a phase and amplitude adjuster for applying a phase adjustment, or an amplitude adjustment, or a phase and amplitude adjustment to each symbol of the modulated symbol stream to produce phase and amplitude adjusted symbols;
   a symbol-to-resource element mapper for mapping the phase and amplitude adjusted symbols to resource elements to obtain a non-orthogonal multiple access (NoMA) signal;
   a transmitter operatively coupled to the symbol-to-resource element mapper, the transmitter configured to transmit the NoMA signal;
   a plurality of configuration inputs for receiving a NoMA configuration for configuring at least one of the bit level processor, the modulation block, the phase and amplitude adjuster, and the symbol-to-resource element mapper for a NoMA implementation, the NoMA configuration comprising at least one of:
      bit level processor parameters that configure of the bit level processor for the NoMA implementation,
      modulation parameters that configure the modulation block for the NoMA implementation,
      phase and amplitude adjustment parameters that configure the phase and amplitude adjuster for the NOMA implementation, or
      mapper parameters that configure the symbol-to-resource element mapper for the NoMA implementation; and
   one or more MA signature inputs for receiving a MA signature configuration for producing a multiple access (MA) signature.

2. The apparatus of claim 1, wherein the one or more MA signature inputs select at least one of:
   a scrambling sequence from a pool of possible scrambling sequences, or
   an interleaving pattern from a pool of possible interleaving patterns, or
   the scrambling sequence and the interleaving pattern, for the NoMA implementation.

3. The apparatus of claim 1, wherein the MA signature configuration selects a set of amplitude adjustments, or phase adjustments, or amplitude and phase adjustments applied by the phase and amplitude adjuster from a pool of possible sets of amplitude adjustments, or phase adjustments, or amplitude and phase adjustments for the NoMA implementation.

4. The apparatus of claim 1, wherein the MA signature configuration selects symbol-to-resource mapping applied by the symbol-to-resource element mapper from a pool of possible symbol-to-resource mappings for the NoMA implementation.

5. The apparatus of claim 1, wherein the NoMA configuration comprises the modulation parameters that configure the modulation block by configuring at least one of:
   modulation order defining how many bits are mapped to a symbol; or
   modulation block size defining how many symbols are produced by the modulation block; or
   bit mapping defining how bits input to the modulation block are mapped to symbols as between a non-overlapping manner in which each bit is mapped to only one symbol, partially overlapping manner in which some but not all bits are mapped to more than one symbol, and fully overlapping manner in which all bits are mapped to multiple symbols.

6. The apparatus of claim 1, wherein the modulation block comprises:
   a plurality of modulators; and
   a bit sub-set generator that generates a respective subset of bits of the output bit sequence for input to each of at least one active modulator of the plurality of the plurality of modulators.

7. The apparatus of claim 6, wherein the NoMA configuration comprises the modulation parameters that configure the modulation block by configuring a number and a type of the at least one active modulator, and configuring the bit sub-set generator to generate the respective subset of bits as either a distinct subset, partially overlapping subset or fully overlapping subset.

8. The apparatus of claim 1, wherein the NoMA configuration comprises the phase and amplitude adjustment parameters that configure the phase and amplitude adjuster by configuring at least one of:
- modulation block size defining how many symbols are processed by the phase and amplitude adjuster; or
- output block size defining how many symbols are output by the phase and amplitude adjuster.

9. The apparatus of claim 1, wherein the NoMA configuration comprises the mapper parameters that configure the symbol-to-resource element mapper by configuring at least one of:
- block size defining how many symbols are input to the symbol-to-resource element mapper; or
- number of resources that are mapped to by the symbol-to-resource element mapper.

10. A method, comprising:
- performing, by a bit level processor of an apparatus, interleaving, or scrambling, or interleaving and scrambling on an input bit sequence to produce an output bit sequence of a same length;
- based on the output bit sequence, producing, by a modulation block of the apparatus, a modulated symbol stream containing at least one symbol;
- applying, by a phase and amplitude adjuster of the apparatus, a phase adjustment, or an amplitude adjustment, or a phase and amplitude adjustment to each symbol of the modulated symbol stream to produce phase and amplitude adjusted symbols;
- mapping, by a symbol-to-resource element mapper of the apparatus, the phase and amplitude adjusted symbols to resource elements to obtain a non-orthogonal multiple access (NoMA) signal;
- transmitting, by a transmitter of the apparatus, the NoMA signal;
- receiving, by a plurality of configuration inputs of the apparatus, a NoMA configuration for configuring at least one of the bit level processor, the modulation block, the phase and amplitude adjuster and the symbol-to-resource element mapper for a NoMA implementation, the NoMA configuration comprising at least one of:
  - bit level processor parameters that configure the bit level processor,
  - modulation parameters that configure the modulation block,
  - phase and amplitude adjustment parameters that configure the phase and amplitude adjuster, or
  - mapper parameters that configure the symbol-to-resource element mapper; and
- receiving, by one of more MA signature inputs of the apparatus, a MA signature configuration for producing a multiple access (MA) signature.

11. The method of claim 10, wherein the one or more MA signature inputs selects at least one of:
- a scrambling sequence from a pool of possible scrambling sequences, or an interleaving pattern from a pool of possible interleaving patterns, or
- the scrambling sequence and the interleaving pattern, for the NoMA implementation.

12. The method of claim 10, wherein the MA signature configuration selects a set of amplitude adjustments, or phase adjustments, or amplitude and phase adjustments applied from a pool of possible sets of amplitude adjustments, or phase adjustments, or amplitude and phase adjustments for the NoMA implementation.

13. The method of claim 10, wherein the MA signature configuration selects symbol-to-resource mapping from a pool of possible symbol-to-resource mappings for the NoMA implementation.

14. The method of claim 10, wherein the NOMA configuration comprises the modulation parameters that configure the modulation block by configuring at least one of:
- modulation order defining how many bits are mapped to a symbol; or
- modulation block size defining how many symbols are produced by the modulation block; or
- bit mapping defining how bits input to the modulation block are mapped to symbols as between a non-overlapping manner in which each bit is mapped to only one symbol, partially overlapping manner in which some but not all bits are mapped to more than one symbol, and fully overlapping manner in which all bits are mapped to multiple symbols.

15. The method of claim 10, further comprising producing the modulated symbol stream by:
- generating a respective subset of bits of the output bit sequence for input to each of at least one active modulator of a plurality of modulators.

16. The method of claim 15, wherein the NoMA configuration comprises the phase and amplitude adjustment parameters that configure the phase and amplitude adjuster by configuring at least one of:
- modulation block size defining how many symbols are processed by the phase and amplitude adjuster; or
- output block size defining how many symbols are output by the phase and amplitude adjuster.

17. The method of claim 10, wherein the NoMA configuration comprises the mapper parameters that configure the symbol-to-resource element mapper by configuring at least one of:
- block size defining how many symbols are input to the symbol to resource dement mapper; or
- number of resources that are mapped to by the symbol-to-resource element mapper.

18. An apparatus, comprising:
- at least one processor; and
- a non-transitory computer readable storage medium storing programming for execution by the at least one processor, the programming including instructions to:
  - cause a bit level processor of the apparatus to perform interleaving, or scrambling, or interleaving and scrambling on an input bit sequence to produce an output bit sequence of a same length;
  - based on the output bit sequence, cause a modulation block of the apparatus to produce a modulated symbol stream containing at least one symbol;
  - cause a phase and amplitude adjuster of the apparatus to apply a phase adjustment, or an amplitude adjustment, or a phase and amplitude adjustment to each symbol of the modulated symbol stream to produce phase and amplitude adjusted symbols;
  - cause a symbol-to-resource element mapper of the apparatus to map the phase and amplitude adjusted symbols to resource elements to obtain a non-orthogonal multiple access (NoMA) signal;
  - cause a transmitter of the apparatus to transmit the NoMA signal;
  - cause a plurality of configuration inputs of the apparatus to receive a NoMA configuration for configuring at least one of the bit level processor, the modulation block, the phase and amplitude adjuster and the symbol-to-resource element mapper for a NOMA implementation, the NOMA configuration including at least one of:
bit level processor parameters that configure the bit level processor,
modulation parameters that configure the modulation block,
phase and amplitude adjustment parameters that configure the phase and amplitude adjuster, or
mapper parameters that configure the symbol-to-resource element mapper; and
cause one of more MA signature inputs of the apparatus to receive a MA signature configuration for producing a multiple access (MA) signature.

19. The apparatus of claim 18, wherein the one or more MA signature inputs select at least one of:
a scrambling sequence from a pool of possible scrambling sequences, or
an interleaving pattern from a pool of possible interleaving patterns, or
the scrambling sequence and the interleaving pattern, for the NoMA implementation.

20. The apparatus of claim 18, wherein the MA signature configuration selects a set of amplitude adjustments, or phase adjustments, or amplitude and phase adjustments applied from a pool of possible sets of amplitude adjustments, or phase adjustments, or amplitude and phase adjustments for the NoMA implementation.

21. The apparatus of claim 18, wherein the MA signature configuration selects symbol-to-resource mapping from a pool of possible symbol-to-resource mappings for the NoMA implementation.

22. The apparatus of claim 18, wherein the NoMA configuration comprises the modulation parameters that configure the modulation block by configuring at least one of:
modulation order defining how many bits are mapped to a symbol; or
modulation block size defining how many symbols are produced by the modulation block; or
bit mapping defining how bits input to the modulation block are mapped to symbols as between a non-overlapping manner in which each bit is mapped to only one symbol, partially overlapping manner in which some but not all bits are mapped to more than one symbol, and fully overlapping manner in which all bits are mapped to multiple symbols.

23. The apparatus of claim 18, wherein the instructions further cause the modulation block to produce the modulated symbol stream by:
generating a respective subset of bits of the output bit sequence for input to each of at least one active modulator of a plurality of modulators.

24. The apparatus of claim 23, wherein the NoMA configuration comprises the phase and amplitude adjustment parameters that configure the phase and amplitude adjuster by configuring at least one of:
modulation block size defining how many symbols are processed by the phase and amplitude adjuster; or
output block size defining how many symbols are output by the phase and amplitude adjuster.

25. The apparatus of claim 18 wherein the NoMA configuration comprises the mapper parameters that configure the symbol-to-resource element mapper by configuring at least one of:
block size defining how many symbols are input to the symbol to resource element mapper; or
number of resources that are mapped to by the symbol-to-resource element mapper.

\* \* \* \* \*

UNITED STATES PATENT AND TRADEMARK OFFICE
CERTIFICATE OF CORRECTION

PATENT NO. : 11,206,113 B2
APPLICATION NO. : 16/565744
DATED : December 21, 2021
INVENTOR(S) : Sanjeewa Herath et al.

It is certified that error appears in the above-identified patent and that said Letters Patent is hereby corrected as shown below:

In the Claims

Claim 1, Column 34, Line 5; delete "of" in between "configure" and "the".

Claim 1, Column 34, Line 11; delete "NOMA" and insert --NoMA--.

Claim 14, Column 36, Line 5; delete "NOMA" and insert --NoMA--.

Claim 17, Column 36, Line 38; delete "dement" and insert --element--.

Claim 18, Column 37, Line 2; delete the 2 occurrences of "NOMA" and insert --NoMA--, respectively.

Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*